(12) United States Patent
Buttolo et al.

(10) Patent No.: US 6,873,944 B1
(45) Date of Patent: Mar. 29, 2005

(54) METHOD OF REAL TIME COLLISION DETECTION BETWEEN GEOMETRIC MODELS

(75) Inventors: Pietro Buttolo, Dearborn, MI (US); Paul J. Stewart, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 759 days.

(21) Appl. No.: 09/686,601

(22) Filed: Oct. 11, 2000

(51) Int. Cl.$^7$ ................................................. G06G 7/48
(52) U.S. Cl. ...................... 703/7; 703/1; 703/2; 703/22; 345/581; 345/179; 345/184
(58) Field of Search ............................ 703/1–7, 21–22; 345/179–184, 581

(56) References Cited

U.S. PATENT DOCUMENTS

| | | | |
|---|---|---|---|
| 4,474,035 A | 10/1984 | Amin et al. | 62/503 |
| 5,150,452 A | 9/1992 | Pollack et al. | 700/255 |
| 5,177,982 A | 1/1993 | Plemens | 62/503 |
| 5,347,459 A | 9/1994 | Greenspan et al. | 700/255 |
| 5,515,489 A | 5/1996 | Yaeger | 345/473 |
| 5,548,694 A | 8/1996 | Frisken Gibson | 345/424 |
| 5,572,634 A | 11/1996 | Duluk, Jr. | 345/419 |
| 5,694,013 A | 12/1997 | Stewart et al. | 318/561 |
| 5,761,391 A | 6/1998 | Sato et al. | 700/255 |
| 5,973,678 A | 10/1999 | Stewart et al. | 345/184 |
| 6,049,756 A | 4/2000 | Libby | 701/301 |
| 6,191,796 B1 * | 2/2001 | Tarr | 345/581 |
| 6,704,694 B1 * | 3/2004 | Basdogan et al. | 703/4 |

OTHER PUBLICATIONS

De Floriani et al, "On-line Space Scupturing for 3D Shape Manipulation," IEEE International Conference on Pattern Recognition, vol. 1, pp. 105–108 (Sep. 2000).*

Erickson et al, "Separation–Sensitive Collision Detection for Convex Objects," Proceedings of the 10th Annual ACM-SIAM Symposium on Discrete Algorithms, pp. 327–336 (1999).*

Cheng et al, "Real–Time Four–Dimensional Collision Detection for an Industrial Robot Manipulator," Journal of Applied Mechanisms & Robotics, vol. 2, No. 2, pp. 20–33 (Apr. 1995).*

* cited by examiner

Primary Examiner—Samuel Broda
(74) Attorney, Agent, or Firm—Ford Global Technologies, LLC

(57) ABSTRACT

A method of real time collision detection between geometric models includes the steps of identifying a current tracking point of a force feedback device colliding with a mesh model of the geometric model and identifying a current triangle associated with the current tracking point, wherein the force feedback device is operatively connected to a computer system. The method also includes the steps of determining a new tracking point of the force feedback device colliding with the mesh model by approximating the new tracking point from the current tracking point and the current triangle, and determining a state of the new tracking point and a known state using the new tracking point and the state of the previous tracking point, wherein the state is inside, on an edge or on a vertex of either the current triangle or a new triangle. The method further includes the steps of using the state of the new tracking point to determine if a predetermined condition is met to conclude that the new tracking point is on the current triangle or if another predetermined condition is met to conclude that the new tracking point crossed to a new triangle, wherein the new triangle is connectively associated with the current triangle.

20 Claims, 13 Drawing Sheets

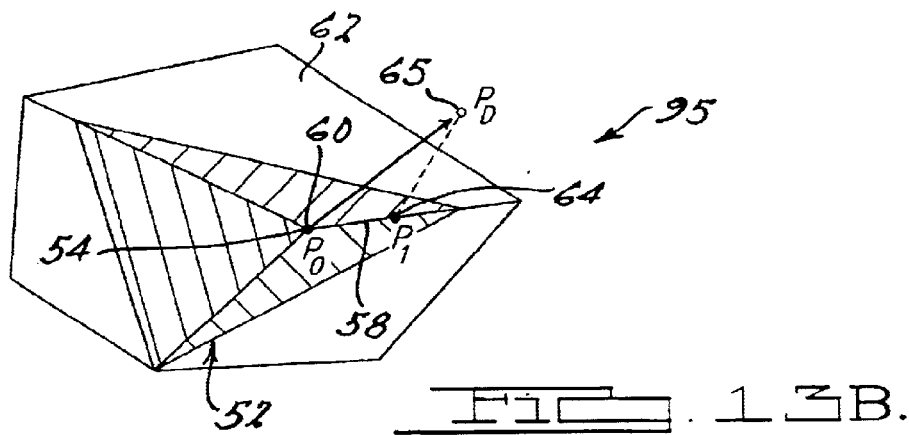
FIG. 13B.
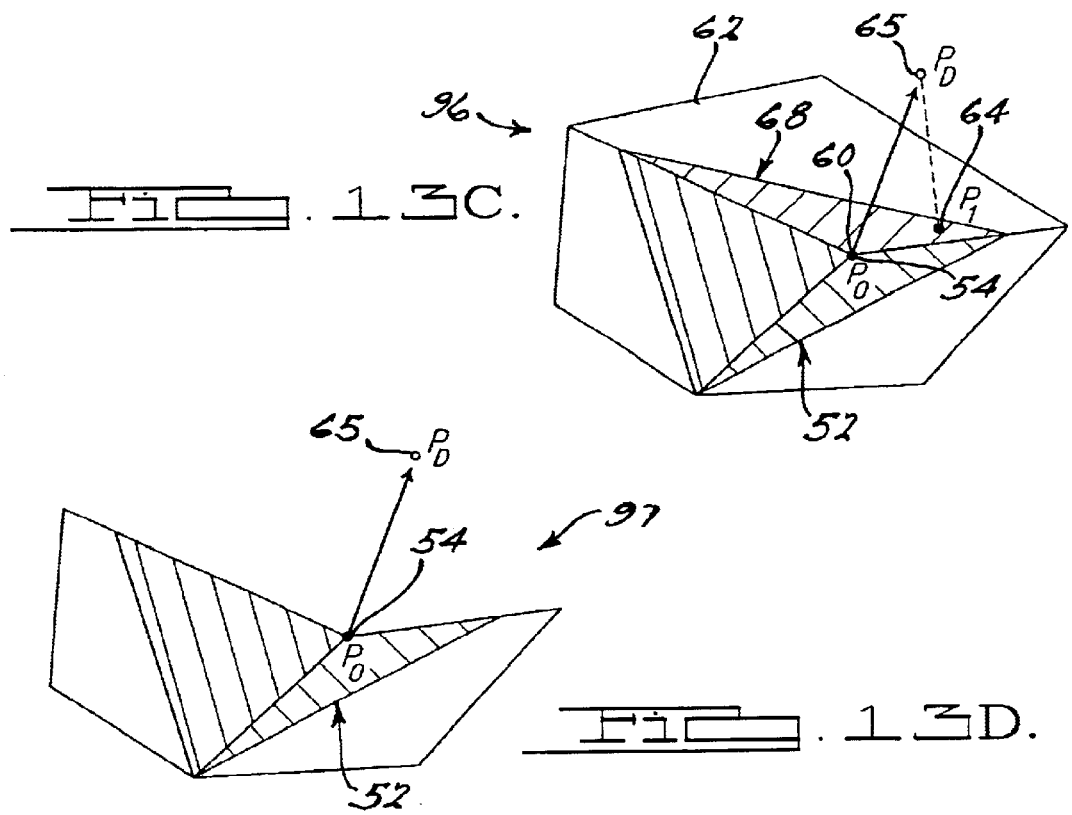
FIG. 13C.
FIG. 13D.
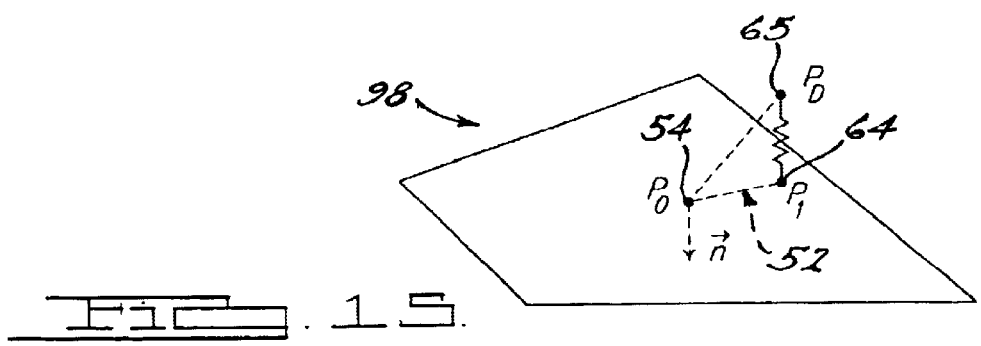
FIG. 15.

METHOD OF REAL TIME COLLISION DETECTION BETWEEN GEOMETRIC MODELS

BACKGROUND OF THE INVENTION

1. Field of the Invention

The present invention relates generally to computer-aided design of vehicles and, more specifically, to a method of real time collision detection between geometric models in the design of a vehicle.

2. Description of the Related Art

Vehicle design, and in particular the design of an automotive vehicle, has advanced to a state in which computer aided design techniques are frequently incorporated in the development of a new vehicle, or redesign of an existing vehicle. At the same time, enhanced visualization software tools have been developed that allow for interactive display and evaluation of large models, including models developed using computer aided design. In the field of vehicle design, the use of both computer aided design and visualization techniques is especially beneficial in designing, packaging and assembling the various systems incorporated within the vehicle, to maximize the design and functional capabilities of these vehicles. Advantageously, potential vehicle system designs can be considered in a timely and cost-effective manner by analyzing a digital representation of a proposed design, versus preparing an actual vehicle model.

Various aspects of the design task for a vehicle include detecting interferences between components, evaluating assembly processes, and understanding vehicle ergonomics. Recently, these types of design tasks have been accomplished using tools such as virtual reality simulations.

A user held interface device, such as a haptic interface, serves as a tactical interface between the user and the virtual world. The haptic interface allows the computing of reaction forces as a result of touching or pushing a virtual object and is a physical device that delivers the computed force to the user through an end effector. An example of such a haptic interface is disclosed in commonly assigned U.S. Pat. No. 5,694,013 to Stewart et al., entitled "Force Feedback Haptic Interface For a Three-Dimensional CAD Surface," the disclosure of which is incorporated by reference. Advantageously, the haptic device reproduces at a high rate of speed the sensation of freely moving an object within a constrained environment by determining the forces exchanged between the interacting geometries.

Collision detection is one technique used to compute reaction force by determining whether, and by how much, two objects interpenetrate. Various collision detection methods have been utilized in the past. One method involves a volumetric representation that divides a space into small eight-sided units, called voxels. Each voxel is assigned a value of zero if part of free space, or one if part of the object. The set of all voxels is called a voxmap. A collision is determined by computing the discrete position of a point in space in the voxmap and checking if the corresponding element is zero, representing no collision or one, signaling a collision. While this method works well for simple systems, it is less accurate for more complex models, since the size of the individual voxel determines the accuracy of the geometric representation. Also, it is difficult to accurately prepare a voxmap from a model as complex as a CAD model of a vehicle, or convert a modified voxmap back into a CAD model.

Another method of collision detection includes creating a mesh model of the CAD model, which is a collection of polygons describing the surface of the CAD model. While this method works well, the search for a polygon colliding with the haptic device is more time consuming than the voxel method. Also, unless the CAD model is already in a mesh format, the geometry represented by a NURBS format, or other free form representations, have to be translated into a mesh. A disadvantage is a decrease in model fidelity and topology.

Still another method of collision detection includes a tracking algorithm to detect collisions with a free form surface. The tracking algorithm determines a tracking point on the surface of the CAD model using a numerical approximation starting from the closest point calculated during a previous iteration. Thus, once an initial point is found, the motion of a cursor can by tracked over the surface. Only the parametric domain and trim boundaries limit the tracking motion. While tracking algorithms work well for collision detection, it can be difficult and time consuming to find an initial starting point. Also, certain geometric features of a NURBS surface, such as ridges and cusps formed by points and knots need to be considered separately from the other NURBS surfaces of the CAD model. Traditionally, the closest point to a polygonal mesh is found by representing the mesh as an unconnected group of triangles. A map, such as a Voronoi map is used to assign the elements of the polygonal soup to different regions of the map, so that coherence can be exploited to check the distance to only those polygons belonging to regions that neighbor the current location of the potentially colliding point. However, this technique does not take advantage of connectivity between triangles by assuming the mesh represents a manifold and each triangle will have neighboring triangles, and each vertex a set of connected polygons.

Thus, there is a need in the art for an efficient method of real time collision detection between a point and a tessellated mesh of a computer aided design model and force feedback to a user regarding the collision.

SUMMARY OF THE INVENTION

Accordingly, the present invention is a method of real-time collision detection between geometric models. The method includes the steps of identifying a current tracking point of a force feedback interface colliding with a mesh model of the geometric model and identifying a current triangle associated with the current tracking point. The force feedback interface is operatively connected to a computer system. The method also includes the steps of determining a new tracking point of the force feedback interface colliding with the mesh model by approximating the new tracking point from the current tracking point and the current triangle, and determining a state of the new tracking point using the new tracking point and the state of the previous tracking point, wherein the state is inside, on an edge or on a vertex of either the current triangle or a new triangle. The method further includes the steps of using the state of the new tracking point to determine if a predetermined condition is met to conclude that the new tracking point is on the current triangle or if another predetermined condition is met to conclude that the new tracking point crossed to a new triangle, wherein the new triangle is connectively associated with the current triangle.

One advantage of the present invention is that a method of real-time collision detection between geometric models is provided that detects a collision between a point and a tessellated mesh of the model. Another advantage of the present invention is that a method is provided that is mathematically efficient in detecting a collision within a complex CAD model. Yet another advantage of the present invention is that a method is provided that can be utilized in interactive visual simulations. Still another advantage of the present invention is that the method integrates tactile feedback in a force enabled simulation to replicate a physical interaction between the user and the model. A further advantage of the present invention is that a method is provided that determines a dynamic motion generated by the collisions between an object and the CAD model.

Other features and advantages of the present invention will be readily appreciated, as the same becomes better understood, after reading the subsequent description taken in conjunction with the accompanying drawings.

BRIEF DESCRIPTION OF THE DRAWINGS

FIGS. 13A through 13D are diagrammatic views illustrating a tracking point constrained to a vertex and moving away from a vertex, according to the method of FIG. 3.

FIG. 15 is a diagrammatic view illustrating a force feedback of the tracking point, according to the method of FIG. 3.

DESCRIPTION OF THE PREFERRED EMBODIMENT(S)

Vehicle design is achieved, according to the present invention, with a generic parametric driven design process. Advantageously, this process allows for flexibility in vehicle design and engineering analysis of the design in a fraction of the time required using conventional design methods. Various computer based tools are integrated to achieve this enormous time and expense savings, including solid modeling, parametric design, and automated studies.

Figure 1:
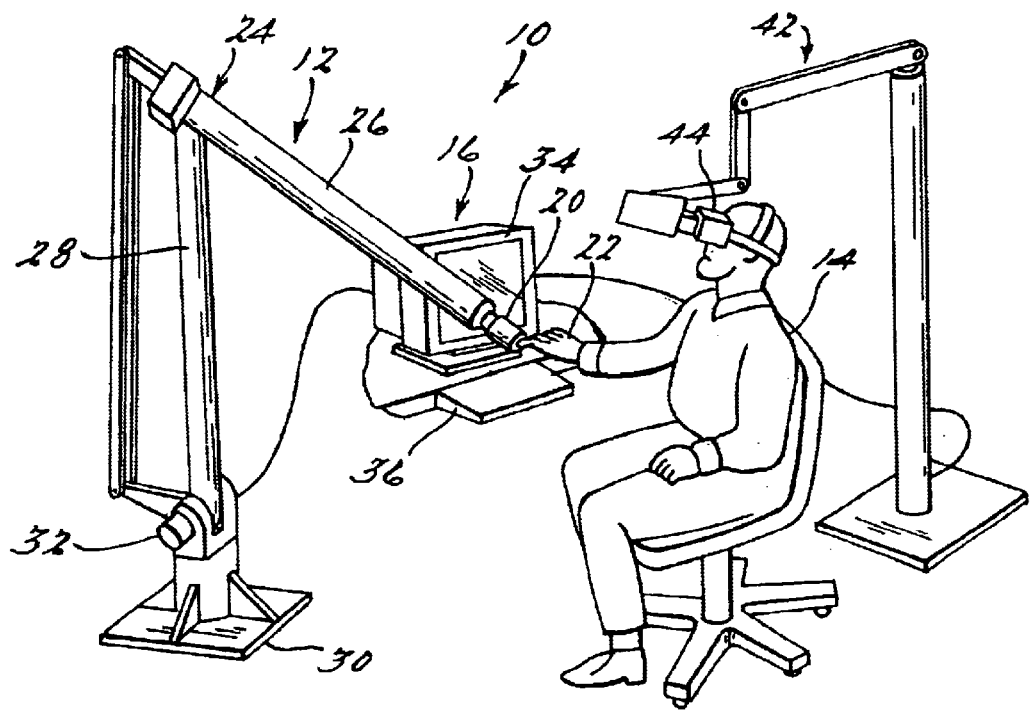
FIG. 1 is a perspective view of a system for implementing a method of real time collision detection between geometric models.
Figure 2:
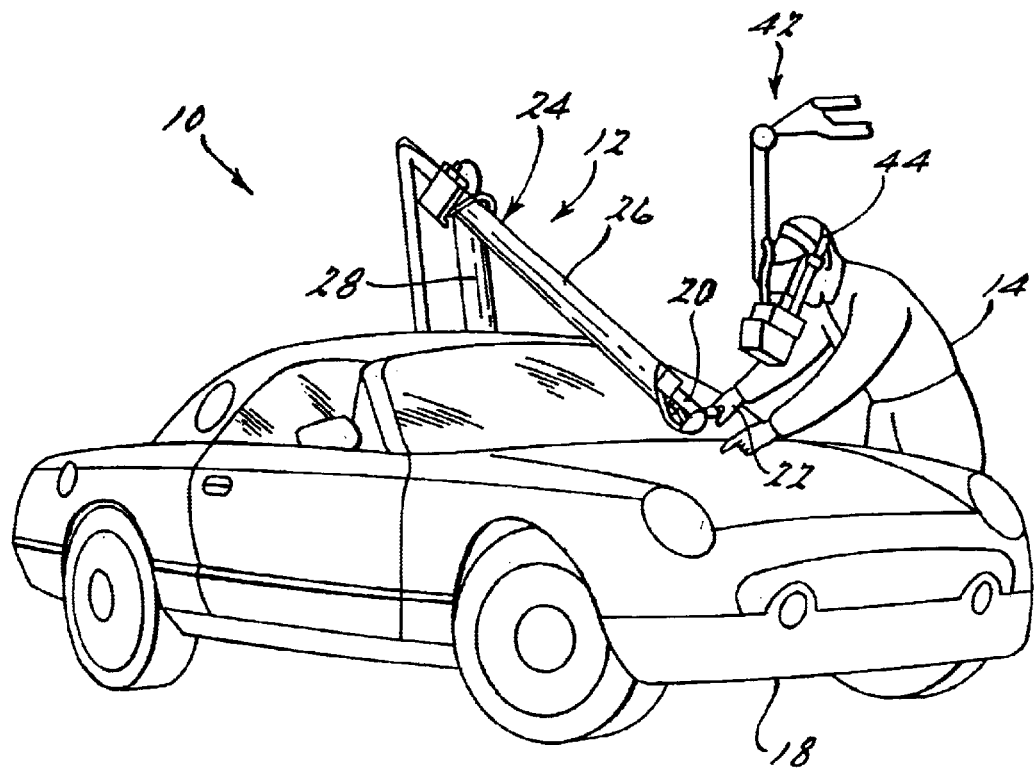
FIG. 2 is a perspective view illustrating the use of the system and method of real time collision detection between geometric models in a virtual environment.

Referring to the drawings and in particular FIGS. 1 and 2, one embodiment of tools 10 used by a method of real time collision detection with a geometric model, according to the present invention, are illustrated graphically. Advantageously, the tools 10 can be utilized to evaluate a vehicle design based on various factors, such as assembly verification, and ergonomics, early in the design process. The tools 10 include a force feedback interface 12 operated by a user 14 that provides position, orientation, and force feedback between the user 14, a computer system 16, and an object 18 such as a vehicle model. It should be appreciated that the model refers to a three-dimensional geometric model, or a physical model as illustrated in FIG. 2. The model is typically generated through the use of conventional computer aided design (CAD), including computer aided manufacturing (CAM) and computer aided engineering (CAE) techniques.

An example of a force feedback interface 12 is a haptic device, as is known in the art. The force feedback device 12 includes an end effector 20, such as a stylus, pen, or any other similar gripping device. The end effector 20 is grasped by a user 14 and generates sensations of rigidity and facial roughness of the object 18. In automotive styling, for example, the end effector 20, in conjunction with the collision detection method to be described, enables the user 14 to touch, feel and edit complex three-dimensional CAD geometry. The end effector 20 also transmits contact force information to the user 14, to indicate a collision. For example, the end effector 20 provides a physical connection between a hand 22 of the user 14 and a computer model, allowing the user 14 to touch the computer model. For example, the user 14 can tap on a portion of the computer model. Advantageously, the force feedback interface provides an interface between a real world and a virtual world.

The force feedback device 12 also includes a hingeable arm 24 operatively connected to the end effector 20. In this example, there is an upper arm 26 and a lower arm 28. The lower arm 28 is operatively attached to a base 30. The hingeable arm 24 is operatively connected to an actuating device 32, such as a servo I/O interface, or other similar device capable of transmitting forces to the end effector 20 through the upper and lower arms 26, 28 in at least three degrees of freedom. Information regarding a collision with the object 18 is transmitted through the end effector 20 and the upper and lower arms 26, 28 to the computer system 16. The collision may include a single point of contact, or multi-point contact, referred to as tracking.

The tools 10 further include a computer system 16, as is known in the art, operatively connected to the force feedback device 12. The computer system 16 includes a processor, a controller, and a memory to process information relevant to the method of real time collision detection between geometric models. The computer system 16 includes a display device 34, such as a video terminal, to display the vehicle model. The user 14 inputs information into the computer system 16 when prompted to do so. Selection and control of the information within a screen can be achieved by the user 14 via a user interactive device 36, such as a keyboard. The set of parameters or the set of instructions may be specific to the method of collision detection, wherein other data and information non-specific to the method of collision detection may already be stored in the memory of the computer system 16. One example of an input method is a pop-up dialog box containing available information or instruction. For example, information may be representative of different vehicle design alternatives. The computer system 16 utilizes the set of information or instruction from the user 14 and any other information in carrying out a method, according to the present invention and discussed in detail subsequently, of real time collision detection between geometric models.

Figure 14:
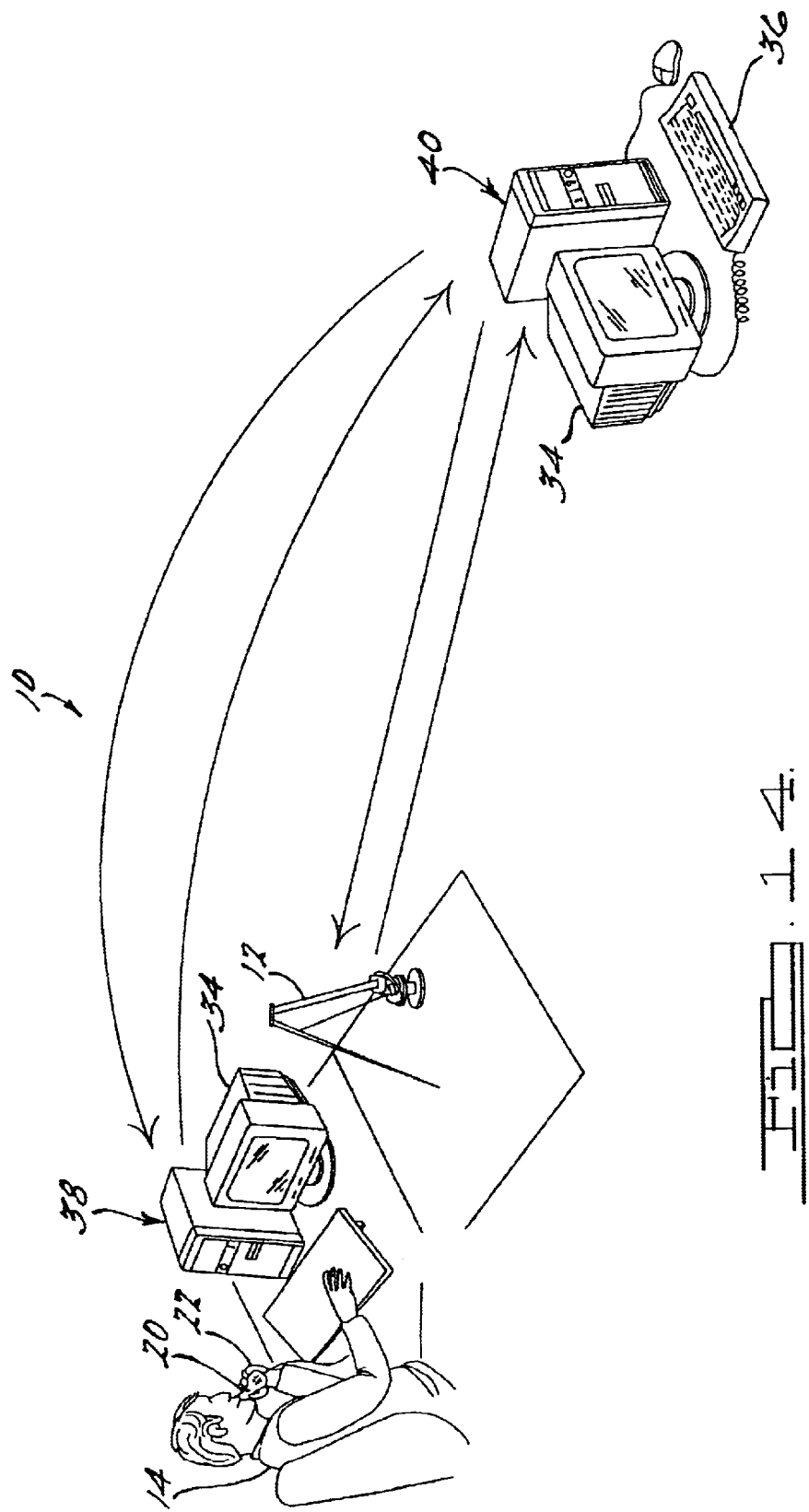
FIG. 14 is a perspective view illustrating a computer system for implementing the method of FIG. 3.

It should be appreciated that the computer system 16 may include a plurality of interconnected computer systems, as illustrated in FIG. 14. For example, the computer system 16 may include a first computer system 38 that operates at a slower, higher level, to carry out the method of collision detection, to be described. The first computer system 38 is operatively connected to a second computer system 40, that operates at a faster, lower level, to implement the force feedback feature of the method. The second computer system 40 operates at a higher refresh rate, iteratively reading the end effector position in joint space, transforming the position into Cartesian space, and calculating the desired force to be applied by the end effector 20 in Cartesian space based on the geometry of a local feature on the mesh model, and the desired impedance-physical properties of the mesh model, and mapping such forces onto joint space to calculate the desired torques to command the device actuators.

The tools 10 also include a virtual reality display system 42, such as a head mounted display mechanism 44, as is known in the art. The head mounted display mechanism 44 is worn by the user 14 and allows the user 14 to "see" a virtual environment, which in this example is the CAD model of a vehicle. The virtual reality display system 42 is in communication with the computer system 16, and provides the user 14 a view through a virtual human's eyes, or a first person view of the virtual environment.

In operation, the controller sends the computer system 16 a signal representing a joint position for the joints between the end effector 20, upper arm 26, lower arm 28 and base 30, respectively. The computer system 16 sends force signals to a controller (not shown), which controls the actuating device 32 to produce the necessary forces at the force feedback device 12. The user 14 can view the geometric model on the display screen 34 or in the head mounted display mechanism 44. The user 14 uses the end effector 20 to "track" along a surface of the geometric model.

The method of the present invention enables the user 14 to touch, feel and edit the geometric model. Advantageously, this is a time and cost savings as compared to performing the same operations on a physical prototype. Furthermore, the computer implemented method of real time collision detection between geometric models combines all of the foregoing to provide an efficient, flexible, rapid tool for evaluating the design of a vehicle. Also, information obtained during the subjective evaluation of the design is an output of the method and is available for further analysis and study.

Figure 3A:
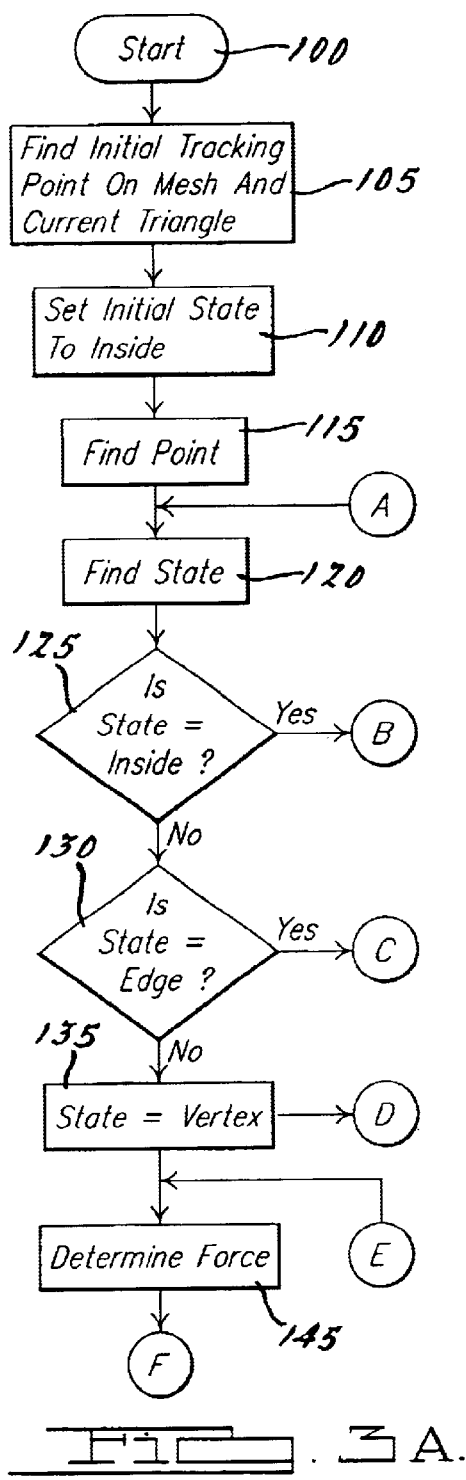
FIGS. 3A through 3E are flowcharts of a method of real time collision detection between geometric models, according to the present invention.

Referring to FIG. 3A, a method, according to the present invention, of real time collision detection between geometric models is illustrated. The method begins in block 100 and continues to block 105. In block 105, the methodology determines an initial tracking point on a tessellated mesh model of the vehicle model of this example for the first iteration of the methodology. It should be appreciated that the initial tracking point is a point of contact of the end effector 20 held by the user 14 on the vehicle model. The initial tracking point may be identified using a technique known in the art as OctTree hierarchic structures. The methodology also identifies a current triangle ($T_i$) shown in FIG. 4 at 52 containing the current tracking point ($P_0$) shown at 54. It should be appreciated that the tessellated mesh model of the vehicle model is built by creating a topological structure of the vehicle model by organizing a list of triangles into a connected surface mesh. The mesh is a collection of polygons, which in this example are triangles, describing a surface of a solid object. Preferably, the surface is divided into a large number of triangles, to represent surface details with a certain degree of accuracy. Further the size of the polygons may not be fixed within all locations on the surface of the model.

Advantageously, the methodology makes assumptions regarding the connectivity of the triangles. Thus, it is assumed that each triangle will have an inside area 56, neighboring triangles along its edges 58, and each vertex 60 has a set of connected polygons (not shown). The methodology also assumes that each facet 62 will have no more than three neighboring triangles, each sharing an entire edge 58 with the facet 62. The methodology further relies on knowing all the triangles connected to each vertex 60. It should be appreciated that the model may need to be remeshed to ensure that these conditions are satisfied. The methodology advances to block 110.

In block 110, the methodology sets a state flag indicating a current location of the tracking point 54 to INSIDE. It is initially assumed that for the first iteration of the methodology the tracking point 54 is located inside the current triangle 52, in order to determined the location of a new tracking point 64. Further, it is understood that an INSIDE state refers to a tracking point positioned within the boundaries of a triangle. Likewise, an EDGE state refers to a tracking point positioned on an edge 58, and a VERTEX state refers to a tracking point positioned at a vertex 60, respectively. The methodology advances to block 115.

Figure 4:
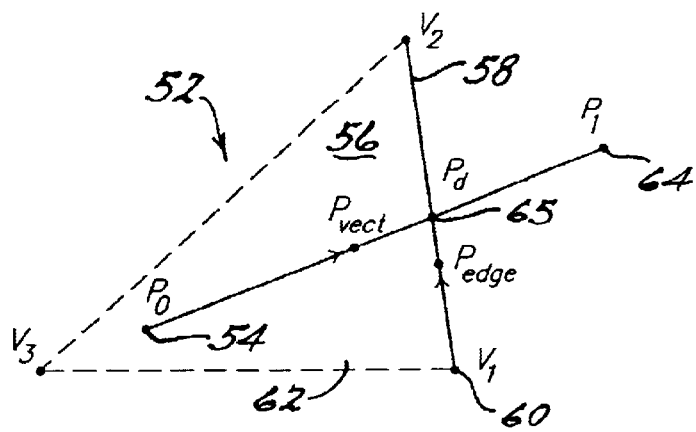
FIG. 4 is a diagrammatic view illustrating a triangle and tracking point according to the method of FIG. 3.

In block 115, the methodology determines a new or the next tracking point $P_1$ shown at 64 for the current end effector position, based upon information known about the previous track point ($P_0$) 54, and the corresponding current triangle ($T_0$) 52. For example, the current triangle 52, current end effector position, and a previous vector are all known. Therefore, a new point $P_1$ shown at 64 may be found by projecting a vector containing the device point $P_d$ shown at 65 down onto a plane defined by the current triangle $T_0$ as shown in FIG. 4. The equation:

$$P_1 = P_0 + (P_0 P_d - P_0 P_d * \bar{n}),$$

where $P_d$ is the end effector position may be used to find point $P_1$. The methodology advances to block 120.

In block 120, the methodology determines the intersection of the vector $P_0 P_1$ with a proper edge of the current triangle. The intersection may be found by expressing the vector $P_0 P_1$ and the edge using a parametric equation $P_{vect} = P_0 + t_{vect}(P_1 - P_0)$ and $P_{edge} = V_1 + t_{edge}(V_2 - V_1)$ as function of $t_{edge}$ and $t_{vect}$.

It should be appreciated that the new tracking point can be located in one of several states, such as inside the current triangle, or along an edge of the current triangle, or on a vertex of the current triangle, or in a new triangle. The parameters $t_{edge}$ and $t_{vect}$ may be used to determine the state of $P_1$. A normal $\vec{N}$ to the plane containing $P_0P_1$ and $V_1V_2$ can be found using the equation:

$$\vec{N} = P_0P_1 * V_1V_2$$

and its maximum component may be found using the equation:

$$\text{Axes} = \max(n_x, n_y, n_z).$$

The plane orthogonal to its maximum component is used for the projection of the current triangle vertices and tracking points.

The new tracking position will be a function of the newly found parameters $t_{vect}$, $t_{edge}$ and the current state of the tracking point. For example, the following equations can be solved for $t_{vect}$ and $t_{edge}$:

$$[(P_1 - P_0) - (V_2 - V_1)] \begin{bmatrix} t_{vect} \\ t_{edge} \end{bmatrix} = V_1 - P_0$$

Figure 5A:
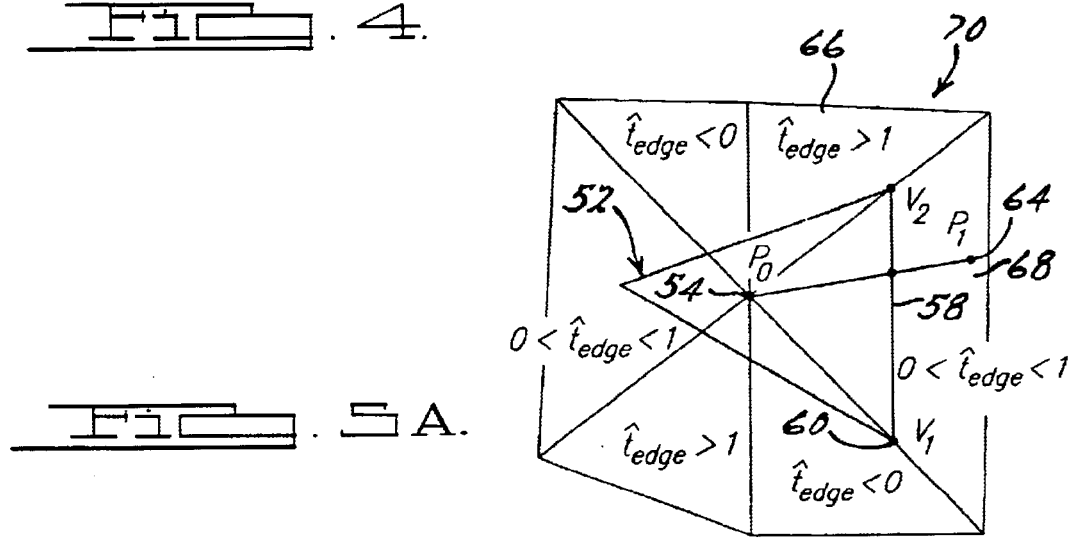
FIGS. 5A and 5B are diagrammatic views illustrating an INSIDE state for a new tracking point, according to the method of FIG. 3.
Figure 5B:
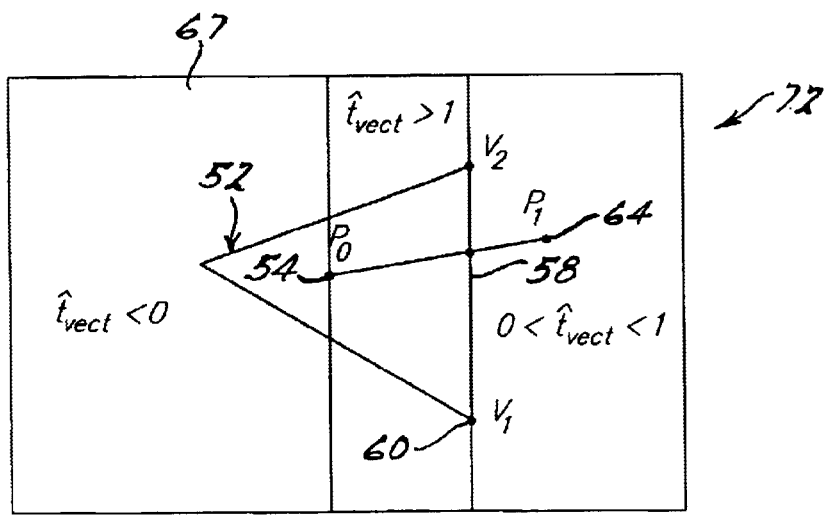

Referring to FIGS. 5A and 5B as shown at 70 and 72, respectively, the value of the parameters $t_{vect}$ and $t_{edge}$ will determine if $P_1$ is inside that same triangle as $P_0$, lies beyond a specific edge or vertex of the current triangle, or if the remaining edges must be checked. The sector pair in which the new point $P_1$ falls is defined in the regions:

$(t_{vect}<0; t_{edge}>1; 0<t_{edge}<1).$

The distance along the tracking line is determined from the parameter $t_{vect}$, which is similarly bounded:

$(t_{vect}<0; t_{vect}>1; 0<t_{vect}<1).$

By examining the various combinations of $t_{vect}$ and $t_{edge}$, it can be determined whether the projected point falls inside or outside the current triangle 52. The plane containing the current triangle 52 is subdivided into slices 66 according to the value of $t_{edge}$, and in stripes 67 according to the value of $t_{vect}$, as shown in FIGS. 5A and 5B, respectively. It should be appreciated that, in this example, both $t_{vect}$ and $t_{edge}$ are between zero and one. The methodology advances to diamond 125.

In diamond 125, the methodology determines if the state flag is set to INSIDE. If the state flag is set to INSIDE, the methodology advances to circle B and continues. If the state flag is not set to INSIDE, the methodology advances to diamond 130. In diamond 130, the methodology determines if the state flag is set to EDGE. If the state flag is set to EDGE, the methodology advances to circle C and continues. If the state flag is not set to EDGE, the methodology advances to block 135.

In block 135, the methodology concludes the state flag is set to VERTEX. The methodology advances to circle D in FIG. 3D and continues.

The methodology returns in circle E and advances to block 145. In block 145, the methodology advances to circle F shown in FIG. 3E and continues.

Figure 3B:
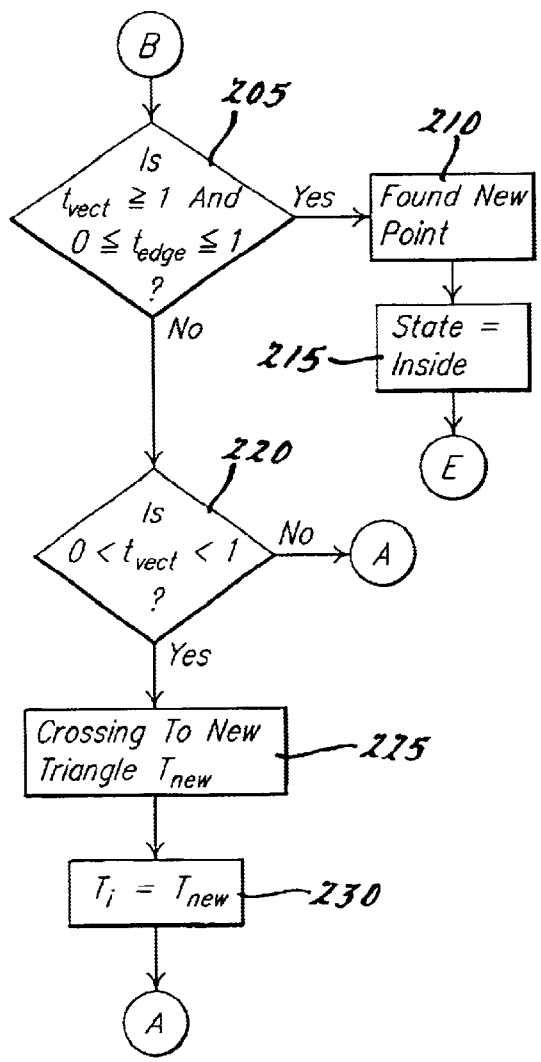

Referring to circle B shown in FIG. 3B, the methodology continues by examining the different combinations of $t_{vect}$ and $t_{edge}$ to locate $P_1$. The methodology advances to diamond 205 and determines if a condition is met indicating that $P_1$ is inside the current triangle 52. An example of a condition is if $t_{vect} \geq 1$ and $0 \leq t_{edge} \leq 1$. If the condition is met, the methodology advances to block 210.

Figure 9A:
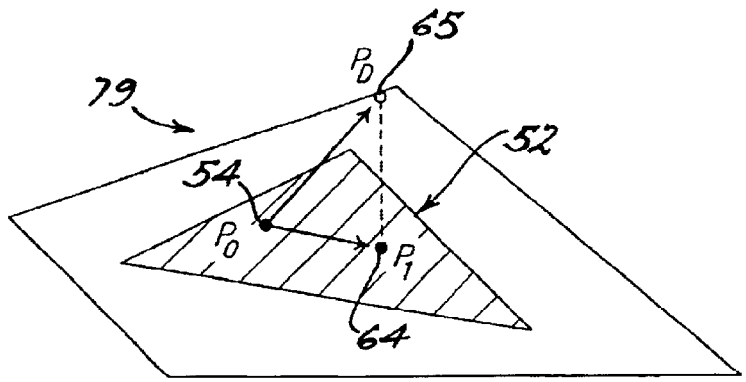
FIGS. 9A through 9C are diagrammatic views illustrating finding a new tracking point when the tracking point motion is contained within a current facet, according to the method of FIG. 3.

In block 210, the methodology concludes that the new tracking point $P_i$ is inside the current triangle 52. An example of a tracking point contained within the current triangle 52 is illustrated in FIG. 9A at 79. Advantageously, the new tracking position is immediately found by substituting either parameter in the set of equations:

$$P_{vect} = P_0 + t_{vect} * (P_1 - P_0) \text{ and}$$

$$P_{edge} = P_1 + t_{edge} * (V_2 - V_1)$$

The new tracking point $P_1$ found on the previous iteration is set equal to the initial point $P_0$, for use in finding the next new tracking point 64. The methodology advances to block 215.

In block 215, the methodology sets the state flag to INSIDE. The methodology advances to circle E in FIG. 3A and continues.

Returning to diamond 205, if the condition is not met, the methodology advances to diamond 220. In diamond 220, the methodology determines if a condition is met that $P_1$ is crossing to a new triangle shown at 68 over a vertex. For example, if $0<t_{vect}<1$, the tracking point is exiting the current triangle 52 crossing the $V_1V_3$ edge, as illustrated in FIGS. 5A and 5B. If the condition is not met that $P_i$ is crossing to a new triangle 68, the methodology returns to circle A in FIG. 3A and looks at another edge to find an intersection.

Returning to diamond 220, if the condition is met that $P_1$ is crossing to new triangle 68, the methodology advances to block 225. In block 225, the methodology uses a look up table (not shown) containing various geometrically derived combinations of $t_{vect}$ and $t_{edge}$ to determine the state, and sets the state flag equal to the state looked up in the table. The methodology advances to block 230.

In block 230, the methodology sets $T_i$ equal to $T_{new}$, since there is insufficient information to tell the position of the new tracking point 64. The methodology advances to Circle A in FIG. 3A and continues.

Figure 3C:
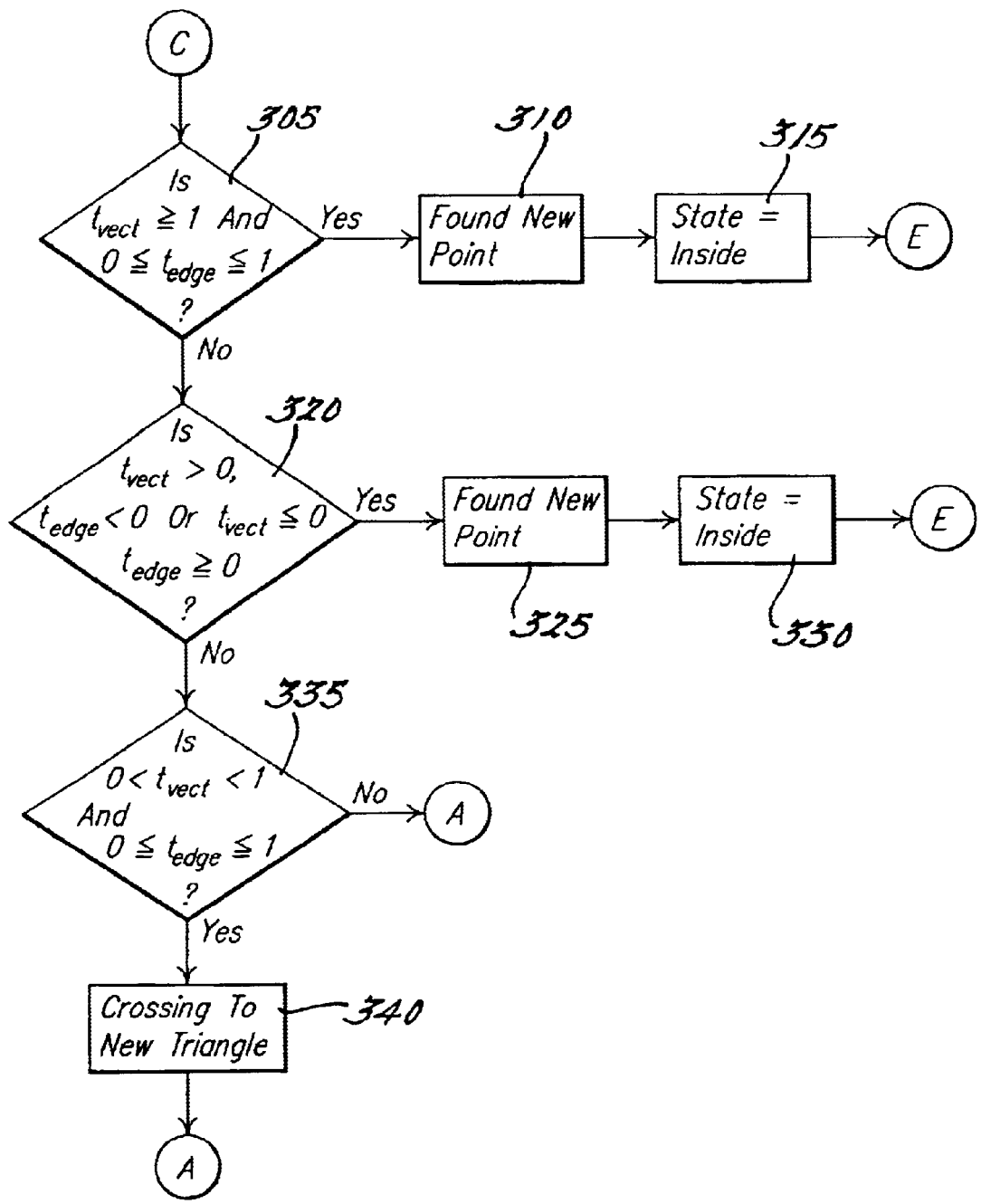
Figure 6A:
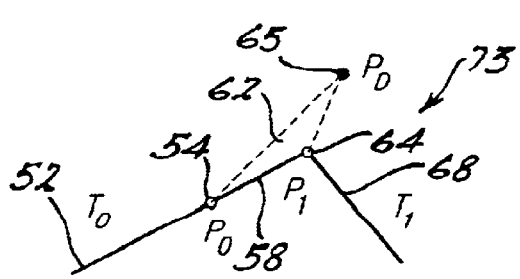
FIGS. 6A and 6B are diagrammatic views illustrating finding a new tracking point starting from a previous position on an edge according to the method of FIG. 3.
Figure 6B:
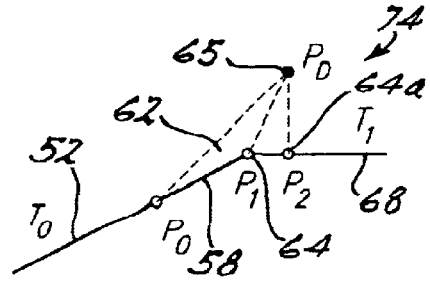
Figure 7A:
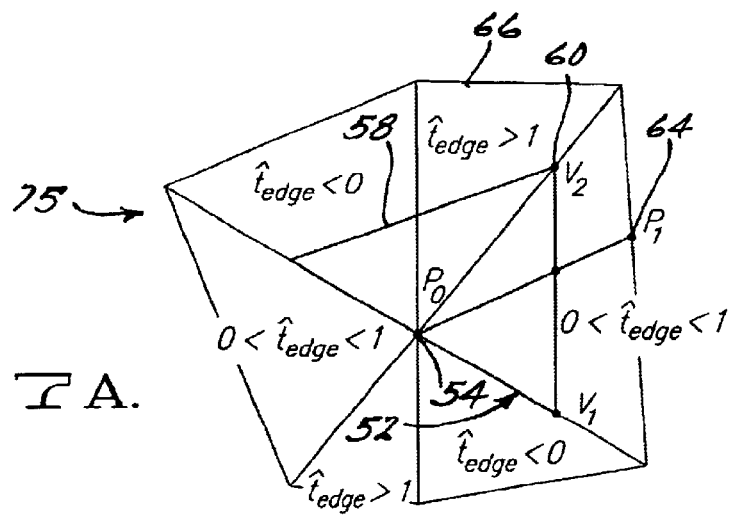
FIGS. 7A and 7B are diagrammatic views illustrating alternatives for finding a new tracking point starting from a previous position on an edge, according to the method of FIG. 3.
Figure 7B:
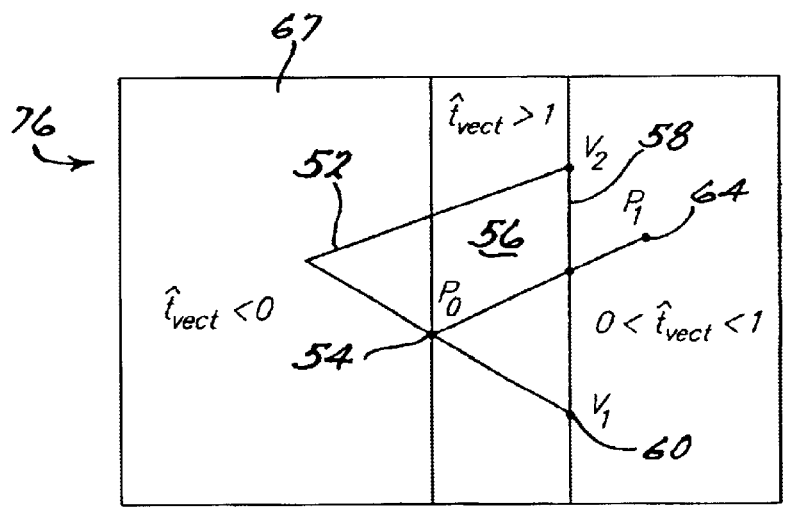

Referring to Circle C shown in FIG. 3C, the methodology advances to diamond 305 and determines a new tracking point 64 from a previous tracking point on an edge 58. Preferably it is determined if the new tracking point is crossing over to a new triangle 68 or whether it is stuck on an edge 58 of the current triangle 52. Referring to FIGS. 6A and 6B, a side view of two facets 62 connected at an edge 58 are illustrated at 73 and 74 respectively. Referring to FIGS. 7A and 7B shown at 75 and 76, respectively, various alternatives as a function of $t_{vect}$ and $t_{edge}$ are further illustrated. In diamond 305, the methodology determines if a condition is met that the new tracking point 64 is moving inside the current triangle 52. An example of this condition is if:

$t_{vect} \geq 1$ and $0 \leq t_{edge} \leq 1$.

If the condition is met, the methodology advances to block 310.

In block 310, the methodology concludes that the new tracking point 64 lies inside the current triangle 52. The methodology advances to block 315. In block 315, the methodology sets a state flag to INSIDE. The methodology advances to circle E in FIG. 3A and continues.

Returning to diamond 305, if the condition is not met that the new tracking point 64 is moving inside the current triangle 52, the methodology advances to diamond 320 and determines if a condition is met that the new tracking point 64 is still on the same edge of the current triangle 52. An example of this condition is if $t_{vect}>0$ and $t_{edge}<0$; or if $t_{vect} \leq 0$ and $t_{edge} \geq 0$. If this condition is met, the methodology advances to block 325 and concludes that the new tracking point 64 is constrained on the current edge 58 of the current triangle 52. The methodology advances to block 330 and sets the state flag to EDGE. The methodology advances to circle E in FIG. 3A and continues.

Returning to diamond 320, if the condition is not met that the new tracking point 64 is still on the same edge of the current triangle 52, the methodology advances to diamond 335. In diamond 335, the methodology determines whether a condition is met indicating the new tracking point 64 is crossing over to a new triangle 68. An example of this condition is if $0<t_{vect}<1$ and $0 \leq t_{edge} \leq 1$. If the condition is not met that the new tracking point 64 is crossing over to a new triangle 68, the wrong edge was selected and the methodology returns to circle A shown in FIG. 3A and continues with another edge.

Returning to diamond 335, if the condition is met that the new tracking point 64 is crossing over to a new triangle 68 either through one of the vertexes $V_1$, $V_2$ or the edge $V_1V_2$, and the methodology advances to block 340. In block 340, the methodology concludes that the new tracking point 64 is crossing over to a new triangle 68. The methodology sets the state flag according to the value of $t_{edge}$ and $t_{vect}$. For example, the various combinations of conditions for $t_{edge}$ and $t_{vect}$ can presented in a matrix form and used as a look-up table (not shown) to set the state flag. It should be appreciated that several iterations may be necessary to determine the final position of the new tracking point $P_i$. The methodology returns to circle A in FIG. 3A and continues in locating the tracking point.

Figure 3D:
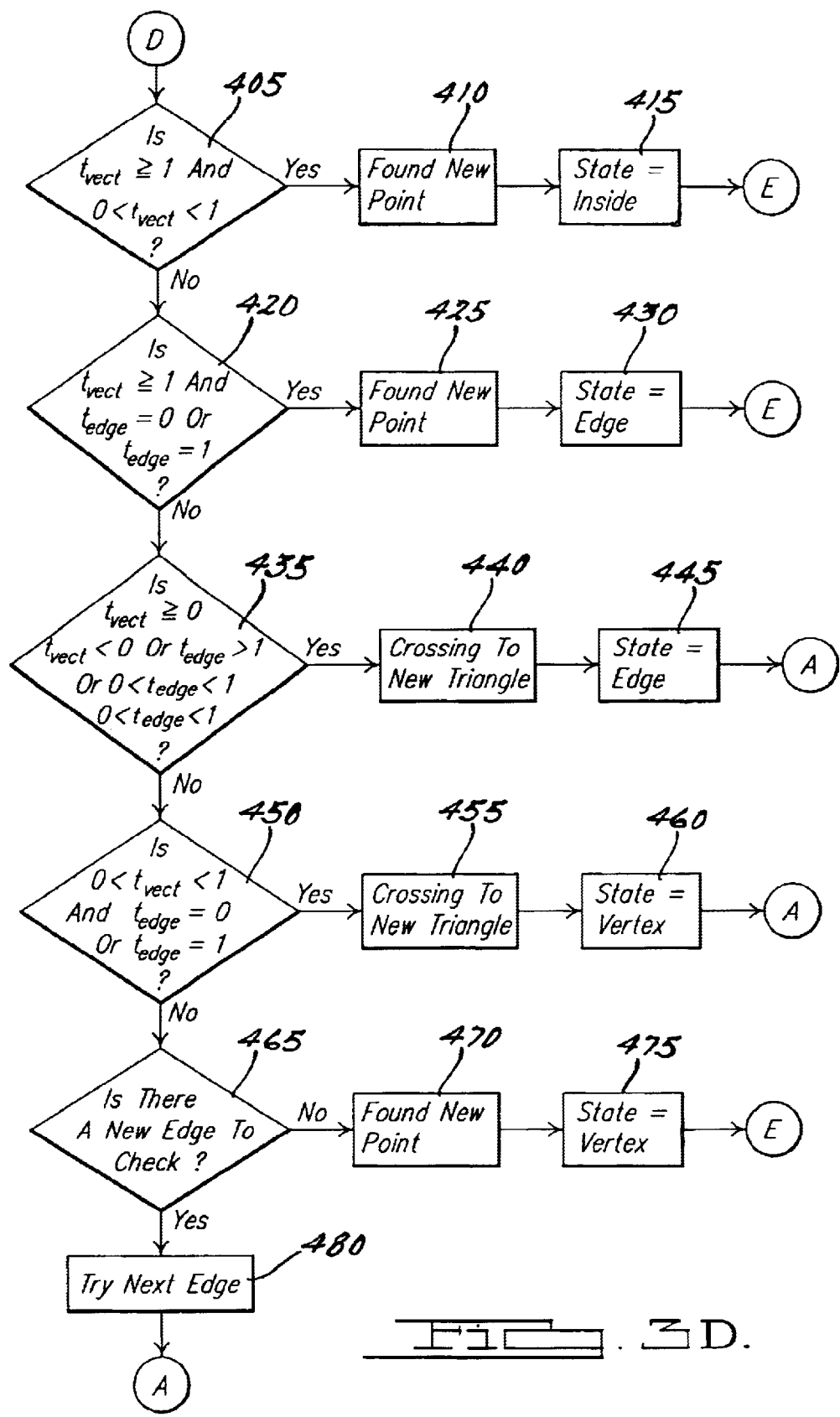
Figure 8A:
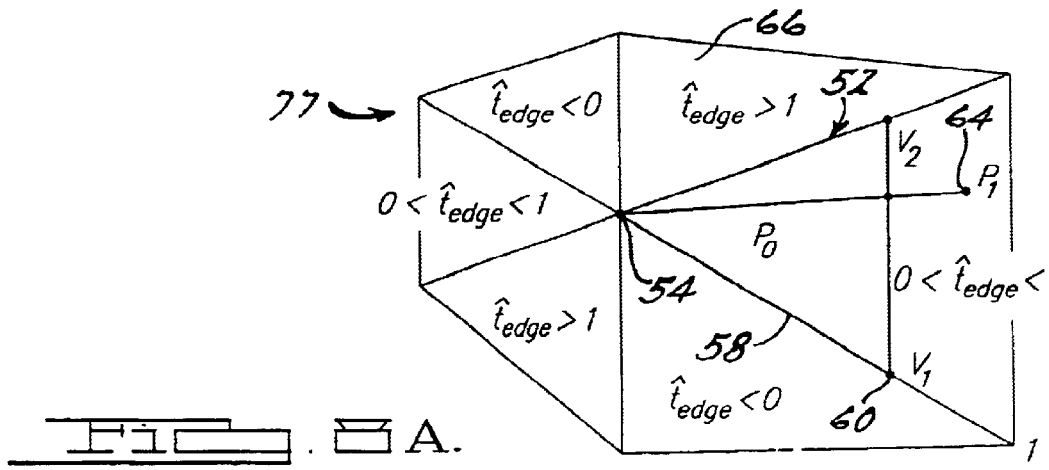
FIGS. 8A and 8B are diagrammatic views illustrating alternatives for finding a new tracking point starting from a previous position on a vertex, according to the method of FIG. 3.
Figure 8B:
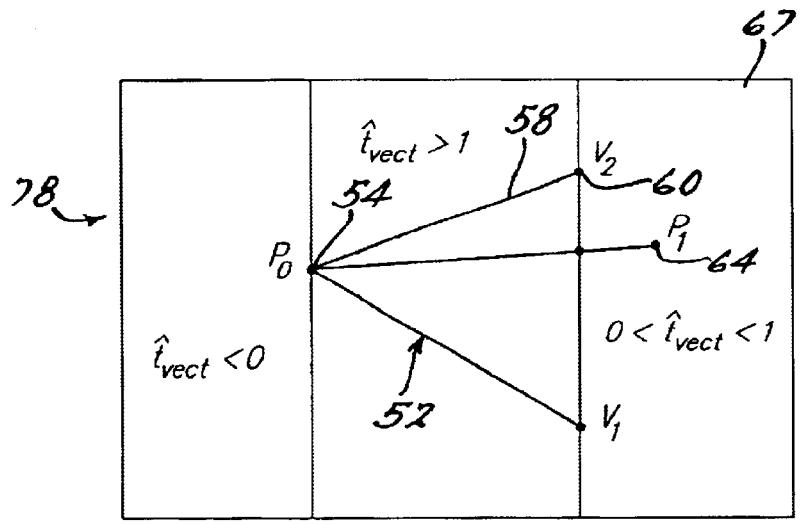

Referring to Circle D shown in FIG. 3D, the methodology assumes that the state of the current tracking point 54 is a VERTEX. It should be appreciated that the new tracking point 64 may be moving across a vertex 60 and could project on any of the new triangles 68 connect to the given vertex 60. Preferably, the mesh is checked for gaps, that is, the set of triangles connected to the vertex 60 may not form a closed manifold. Further, if the new tracking point 64 projects on more than one new triangle 68, that triangle 68 should be determined. Referring to FIGS. 8A and 8B as shown at 77 and 7B respectively, various cases are illustrated for a vertex. The methodology advances to diamond 405.

In diamond 405, the methodology determines if a condition is met that the new tracking point 64 is moving from the vertex back into the current triangle 52 connected with the vertex. An example of this condition is if:

$t_{vect} \geq 1$ and $0<t_{edge}<1$.

If the condition is met, than the new tracking point 64 is moving from the vertex into the current triangle 52. The methodology advances to block 410. In block 410, the methodology concludes that the new tracking point is found. The methodology advances to block 415 and sets a state flag to INSIDE. The methodology advances to circle E in FIG. 3A and continues.

Returning to diamond 405, if the condition is not met, that the tracking point is moving from the vertex 60 to inside the current triangle 52, the methodology advances to diamond 420.

In diamond 420, the methodology determines if a condition is met that the new tracking point 64 is moving from the vertex 60 to an edge 58. For example, if $t_{vect} \geq 1$ and ($t_{edge}=0$ or $t_{edge}=1$), then the new tracking point 64 is moving from the vertex 60 to an edge 58. If the condition is met that the new tracking point 64 is moving from the vertex 60 to an edge 58, the methodology advances to block 425. In block 425, methodology concludes that a new tracking point 64 is along an edge 58. The methodology advances to block 430 and sets a state flag equal to EDGE. The methodology advances to circle E in FIG. 3A and continues.

Returning to diamond 420, if a condition is not met that the new tracking point 64 is moving from the vertex 60 to an edge 58, the methodology advances to diamond 435. In diamond 435, the methodology assumes that the new tracking point 64 is crossing over to a new triangle 68. The methodology determines if a condition is met that the new tracking point 64 is on an edge 58 of a new triangle 68. For example, if:

$t_{vect} \geq 0$ and ($t_{edge}<0$ or $t_{edge}>1$); or $0<t_{edge}<1$ and $0<t_{edge}<1$;

then the new tracking point 64 is moving to an edge of a new triangle 68. If a condition is met that the new tracking point 64 is moving to an edge 58 of a new triangle 68, the methodology advances to block 440.

In block 440, the methodology concludes that the new tracking point 64 has crossed over to a new triangle 68 and is on an edge 58, but cannot conclude whether this is the final position of the new tracking point 64. The methodology advances to block 445 and sets a state flag to EDGE. The methodology returns to circle A in FIG. 3A and continues determining the position of the tracking point.

Returning to diamond 435, if a condition is not met that the new tracking point 64 is moving to a new triangle 68 and is on an edge 58, the methodology advances to diamond 450. In diamond 450, the methodology determines if a condition is met that the new tracking point 64 has crossed onto a vertex 60 of the new triangle 68. For example, if:

$0<t_{vect}<1$ and ($t_{edge}=0$ or $t_{edge}=1$), the new tracking point 64 has moved onto a vertex of a new triangle 68. If the condition is met that the new tracking point 64 has crossed onto a vertex 60 of the new triangle 6B, the methodology advances to block 455.

In block 455, the methodology concludes that the new tracking point 64 has moved to a vertex 60 of a new triangle 68, but the methodology cannot assume that this is the final position of the new tracking point 68. The methodology advances to block 460 and sets a current state flag equal to VERTEX. The methodology advances to circle A in FIG. 3A and continues to find the position of the new tracking point 64.

Returning to diamond 450, if the condition is not met that the new tracking point 64 has crossed into a new triangle 68 and is on a vertex 60, the methodology advances to diamond 465. In diamond 465, the methodology determines if a condition is met indicating there is a new edge 58 of the current triangle 52 to check for locating the new tracking point 64. If the condition is not met indicating there is a new edge 58 to check, the methodology advances to block 470. In block 470, the methodology concludes that the new tracking point 64 is on the same vertex 60 on the current triangle 52. The methodology advances to block 475 and sets a state flag equal to a VERTEX. The methodology advances to circle E in FIG. 3A and continues.

Returning to diamond 465, if the condition is met that there is a new edge 58 to check, the methodology advances to block 480. The methodology concludes that the new tracking point 64 is stuck on an edge 58. The methodology sets the current state flag to EDGE. The methodology advances to circle A in FIG. 3A and continues to determine which edge the tracking point is on.

Figure 9B:
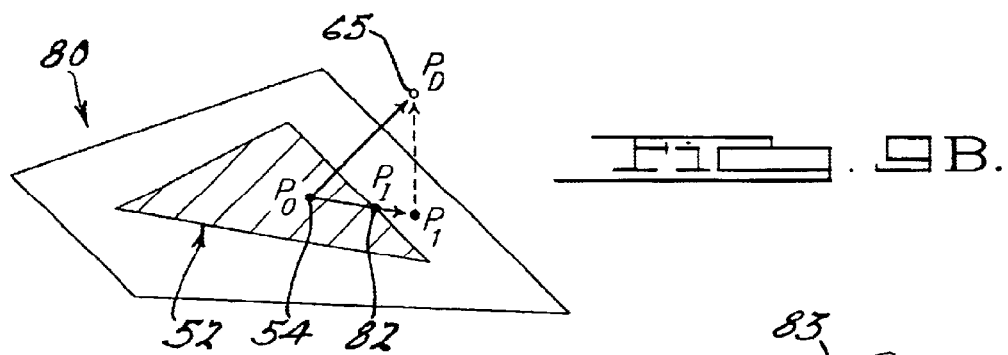
Figure 9C:
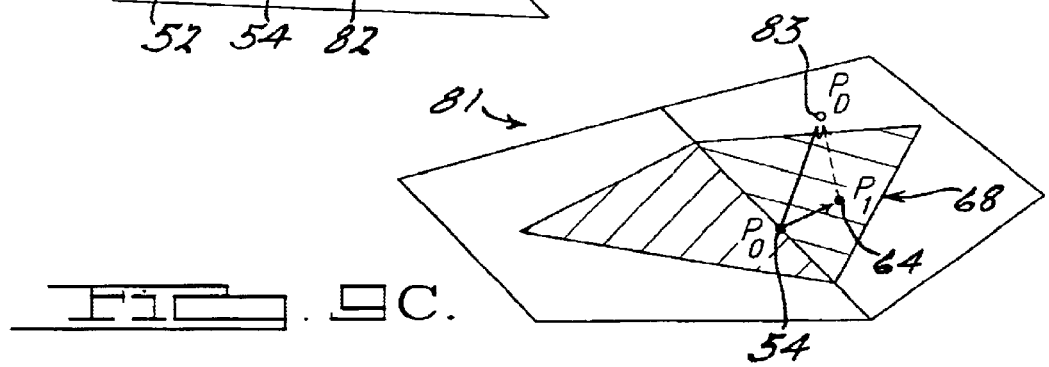

It should be appreciated that more than one iteration of the methodology may be necessary to determine the new tracking point 64. For example, if the new tracking point 64 gets close to the current triangle boundary, a small displacement may cause it to cross the edge 58 into a new triangle 68. As illustrated in FIGS. 9B and 9C at 80 and 81 respectively, during a first iteration (FIG. 9B), the tracked point is dropped onto the plane containing the current facet shown at 82, and the intersection with the boundary is found. The state flag is set to EDGE, the neighboring triangle becomes the current facet. During the second iteration, (FIG. 9C), the tracked point shown at 83 is dropped onto the plane containing the newly set current triangle, which is inside the facet. The state flag is set to INSIDE.

Figure 10A:
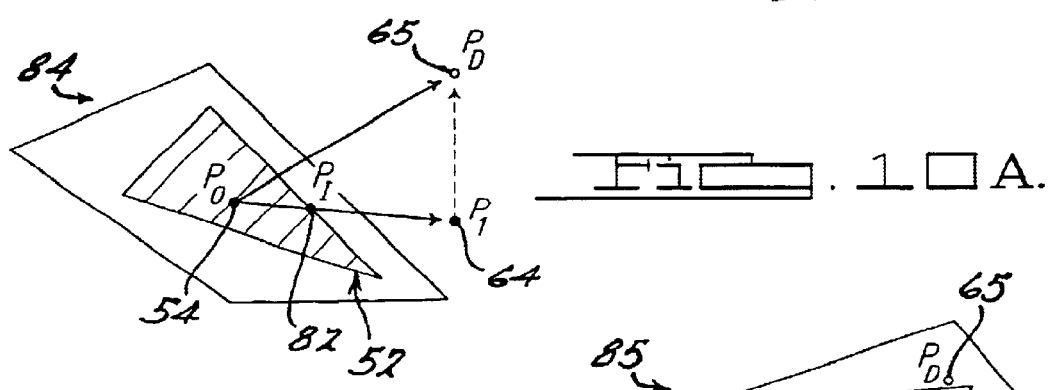
FIGS. 10A through 10C are diagrammatic views illustrating finding a new tracking point when the displacement is large relative to the size of the facet, according to the method of FIG. 3.
Figure 10B:
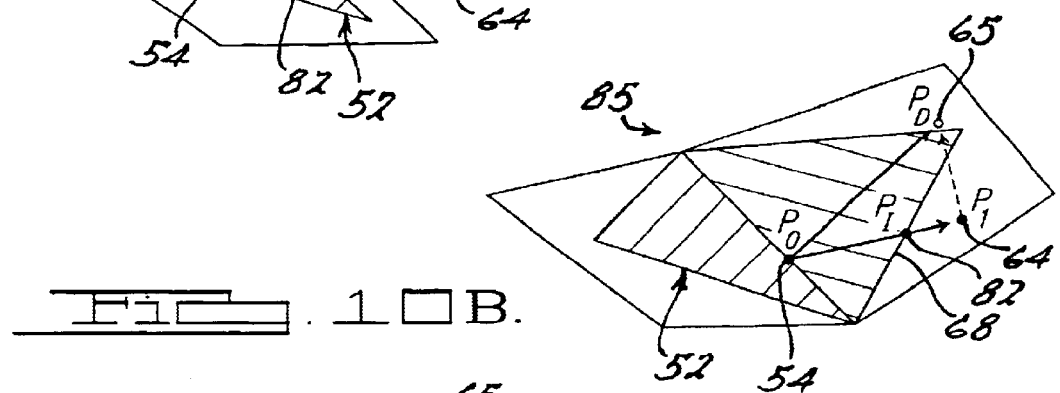
Figure 10C:
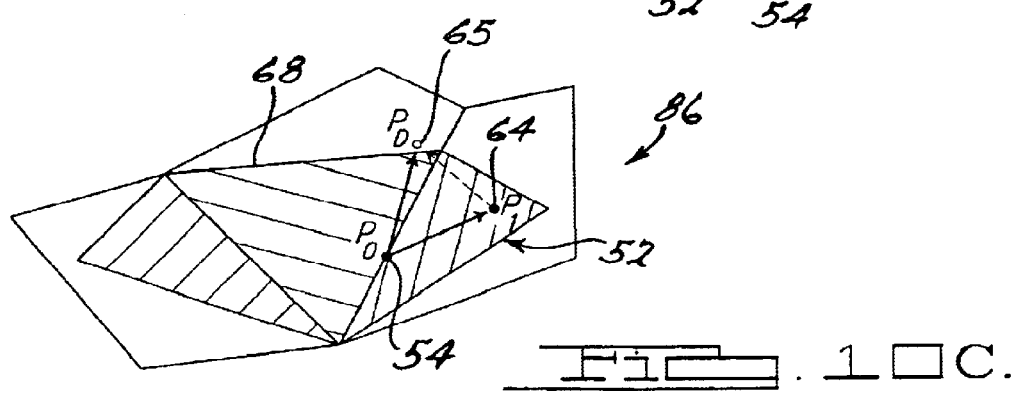
Figure 11A:
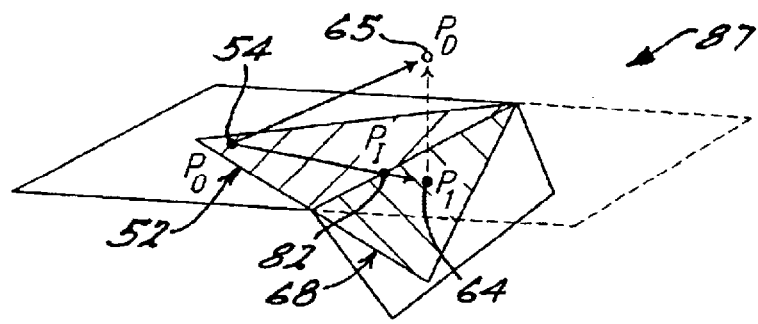
FIGS. 11A through 11C are diagrammatic views illustrating finding a new tracking point constrained on a convex edge, according to the method of FIG. 3.
Figure 11B:
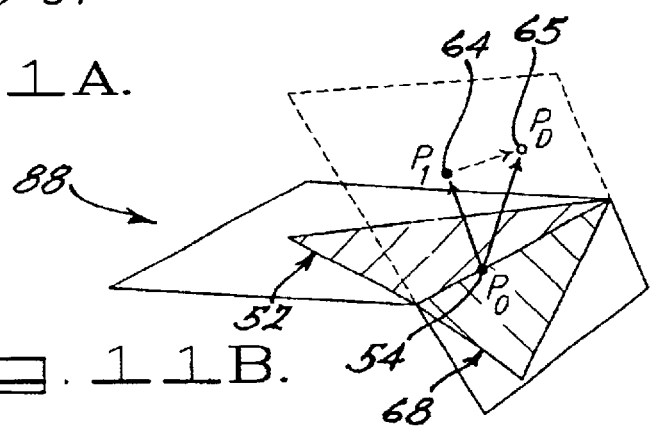
Figure 11C:
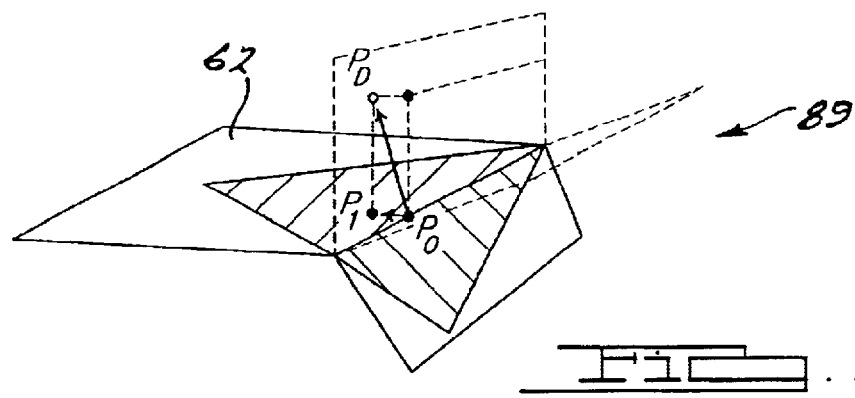

Similarly, if the displacement is large, three iterations are required to find the new tracking point, as shown in FIGS. 10A, 10B and 10C at 84, 85 and 86 respectively. It should be appreciated that the number of iterations is generally equal to the number of crossed triangles. As illustrated in FIGS. 11A, 11B and 11C shown at 87, 88, and 89 respectively, the tracking point 64 is initially inside the triangle as shown in FIG. 11A. It drops at the edge 58 with the neighboring triangle. In the next iteration the tracking point 64 moves back to the previous triangle as shown in FIG. 11B at 88. The methodology determines that the tracking point 64 is constrained on a convex edge. Once the tracking point 64 is constrained on an edge, various scenarios are possible, as shown in FIGS. 11C, 12A through 12D and 13A through 13D. Referring to FIG. 1C, the new tracking point 64 drops outside the current edge and inside the current triangle 52 as shown at 89. The methodology determines that the new tracking point 64 is inside the current triangle 52.

Figure 12A:
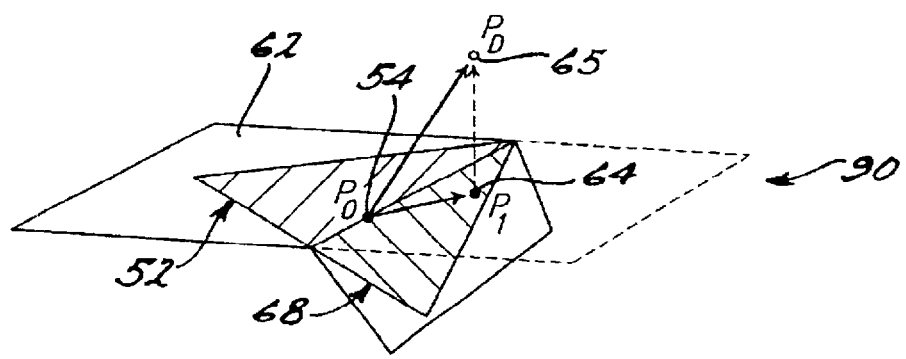
FIGS. 12A through 12D are diagrammatic views illustrating a tracking point moving along an edge, according to the method of FIG. 3.
Figure 12B:
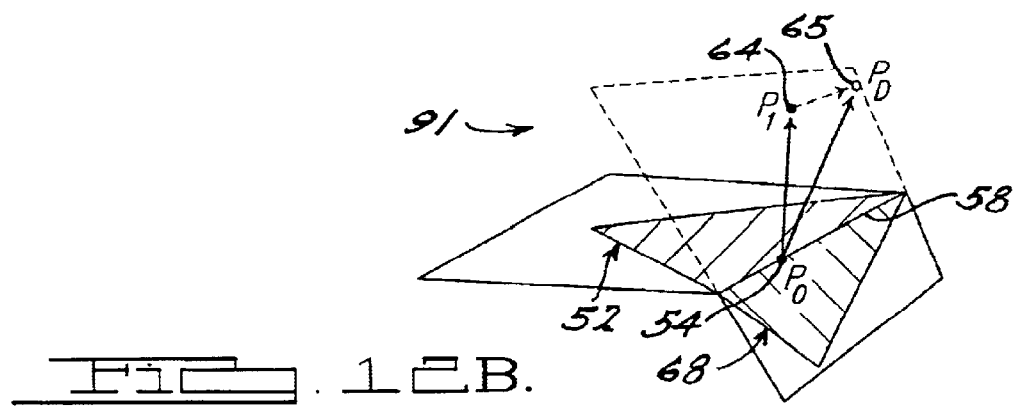
Figure 12C:
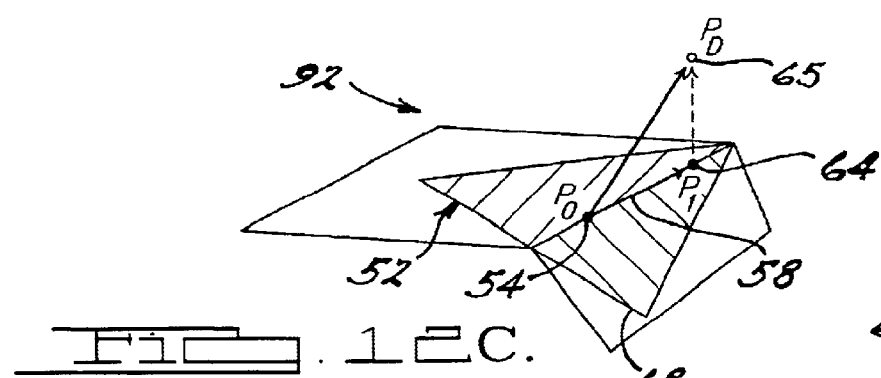
Figure 12D:
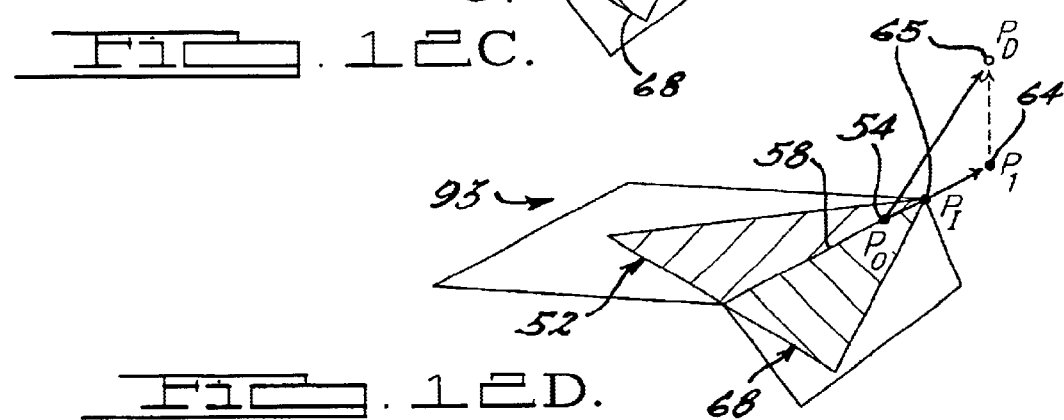

As illustrated in FIGS. 12A, 12B, 12C, and 12D at 90, 91, 92 and 93 respectively, if the displacement vector does not drop onto either semi-plane, the methodology will try to move the tracking point from the current edge to a neighboring facet, and then back to the original triangle. However, the tracking point 64 is constrained on an edge, and moves along the edge. As shown in FIG. 12D at 93, the tracking point 64 keeps sliding along the edge 58 until it reaches a vertex 60.

Figure 13A:
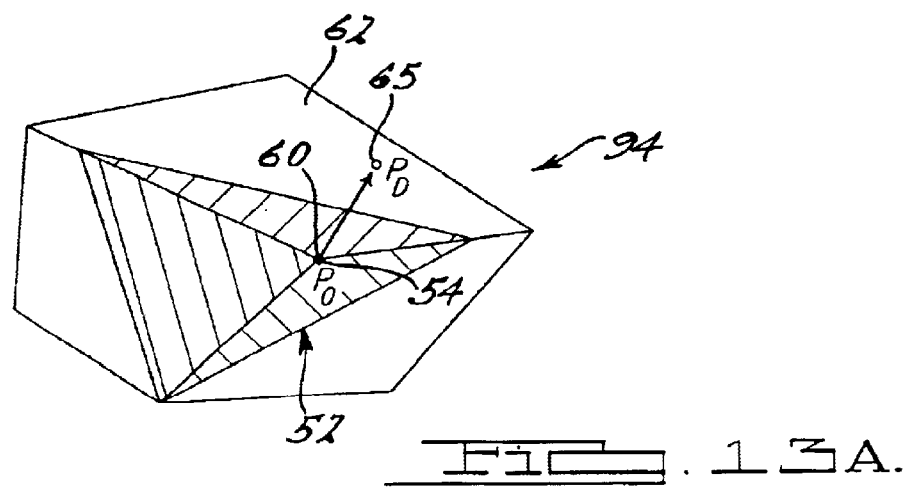

Once on the vertex 60, the tracking point 64 remains there as shown in FIG. 13A until the displacement is large enough to move onto a connected edge, as shown in FIG. 13B at 95, or a connected triangle, as shown in FIG. 13D at 97, or if contact is broken, as shown in FIG. 13C at 96.

Figure 3E:
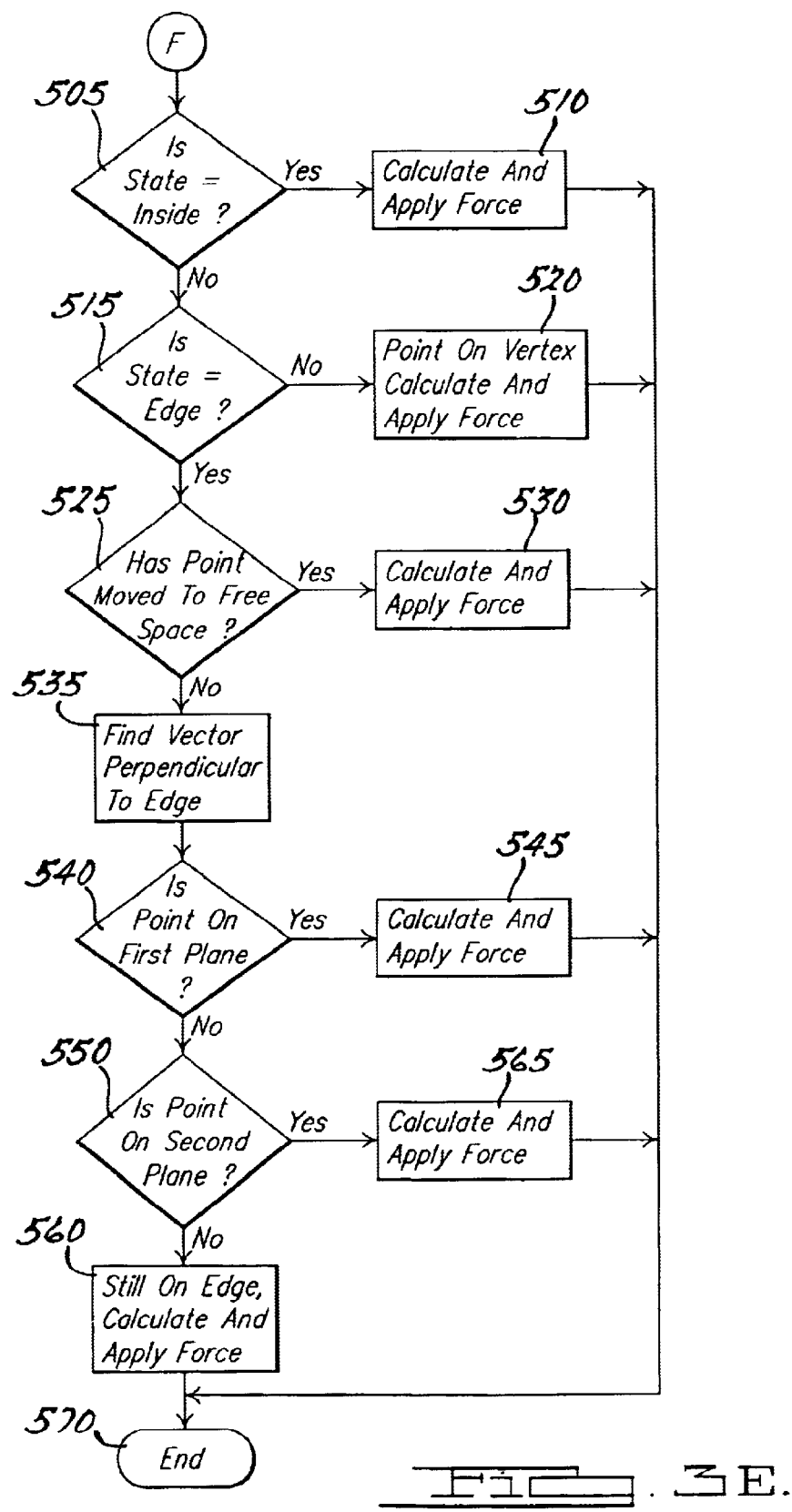

Referring to circle F shown in FIG. 3E, the methodology determines a force feedback of the new tracking point 64. Force feedback refers to penetration of the tracking point into the plane representing the surface of the model 18. As illustrated in FIG. 14, a higher level first computer system 38 is utilized to check for collisions with the mesh and track a point on the mesh once a collision has occurred, as well as provide this information to a lower level second computer system 40. The second computer system 40 can operate at a higher refresh rate than the higher level first computer system 38, and can be used to determine and apply a continuous force feedback through the force feedback device 12 to the user 14. It should be appreciated that the new tracking point 64 is constrained to be on the mesh of the model and follows the force feedback device 12. It should also be appreciated that the tracking point can be lying on either a facet 62, an edge 58, or a vertex 60. The methodology begins in circle F, and continues to diamond 505.

In diamond 505, the methodology determines if a state flag is set to INSIDE. If the state flag is set to INSIDE, the methodology advances to block 510 and calculates a force and applies the force through the force feedback device 12. In this example, the force is modeled as a uniformly distributed spring and damper mesh as shown in FIG. 15 at 98, and determined using:

$$F = (K_p + sK_d)(P_0 P_d * N)N$$

$$F = (P_0 P_d * N)N$$

$$F = (P_0 P_d * N)N$$

where $K_d$ is a damping coefficient and $K_p$ is a stiffness coefficient for a spring, $P_0$ is any point on the mesh and $P_d$ is the position of the tracking point. The calculated force is applied using the force feedback device 12, and more specifically the end effector 20, to replicate the feeling of contact with a rigid object 18. The methodology advances to circle 570 and ends.

Returning to diamond 505, if the state flag is not set to INSIDE, the methodology advances to diamond 515. In diamond 515, the methodology determines if the state flag is set to EDGE. If the state flag is not set to EDGE, the methodology advances to block 520. In block 520, the methodology assumes that the new tracking point 64 is on a vertex 60, and calculates the contact force and applies the calculated contact force using the force feedback device 12. In this example, the vertex 60 is locally approximated as a gravitational sphere, and the contact force is calculated using:

$$F = K(P_d - P_0).$$

It should be appreciated that the force feedback device 12 will apply the calculated contact force until it receives an update on a new tracking point 64 from the higher level first computer system 38. The methodology advances to circle 570 and ends.

Returning to diamond 515, if the state flag is set to EDGE, the methodology advances to diamond 525. In diamond 525, the methodology knows that the new tracking point 64 is on an edge 58, but may have moved. It should be appreciated that the methodology knows that $P_0$ is a point on the edge, $n_1$, and $n_2$ are normal to two planes forming the edge, and $l_{edge}$ is a unit vector aligned with the edge. The methodology determines if a condition is met indicating the new tracking point 64 has moved to free space. An example of this condition is if $P_0 P_d * N_1 \geq 0$ and $P_0 P_d * N_2 \geq 0$. If the condition is met that the new tracking point 64 has moved to free space, the methodology advances to block 530.

In block 530, the methodology concludes that the new tracking point 64 has moved to free space, and calculates and applies the contact force. In this example, free space refers to an occurrence of the end effector 20 of the force feedback device 12 breaking contact with the surface of the model 18. Therefore, the applied contact force is zero, F=0. The methodology advances to circle 57 and ends.

Returning back to diamond 525, if the condition is not met that the new tracking point 64 is moving to free space, the methodology advances to block 535. In block 535, methodology concludes that the new tracking point 64 is on an edge 58, but the new tracking point may be locked onto the edge 58, or sliding on one of the two connected facets 62 with the edge 58. The methodology finds a vector perpendicular to the edge. For example, the vector (V) is determined from:

$$V + P_0 P_d - (P_0 P_d * l_{edge}) l_{edge}$$

Where $l_{edge} = n_1 * n_2$ is a vector collinear with the edge. The remaining vector is projected along two vectors coplanar with the two facets and orthogonal to the edge. The methodology advances to diamond 540.

In diamond 540, the methodology determines if the tracking point 64 is on top of the first plane, or second plane, or locked on the edge. The methodology first determines if a condition is met indicating that the tracking point 64 is on the first plane. An example of such a condition is if:

$$[V^*(-n_1)]^*l_{edge} \geq 0 \text{ and}$$

$$[V^*(-n_2)]^*l_{edge} \geq 0.$$

If the condition is met that the tracking point 64 is on the first plane, the methodology advances to block 545.

In block 545 the methodology concludes that the new tracking point 64 is on plane $n_1$ and determines the contact force and applies the calculated contact force. For example, the contact force can be calculated using:

$$F=K(P_0P_d-n_1)N_1.$$

The calculated contact force is applied to the end effector 20 of the force feedback interface 12. The methodology advances to circle 570 and ends.

Returning to diamond 540, if the condition is not met that the point is on a first plane, the methodology advances to diamond 550. In diamond 550, the methodology determines if a condition is met indicating that the tracking point 64 is on a second plane. An example of this condition is:

$$[V^*(-N_1)]^*l_{edge} < 0 \text{ and } [V^*(-N_2)]^*l_{edge} \geq 0.$$

If the condition is met that the point is on the second plane, the methodology advances to block 555.

In block 555 the methodology concludes that the new tracking point 64 is on plane $n_2$ and determines the contact force and applies the calculated contact force. For example, the contact force can be calculated using:

$$F=K(P_0P_d-N_2)N_2.$$

The calculated contact force is applied to the end effector 20 of the force feedback device 12. The methodology advances to circle 570 and ends.

Returning to diamond 550, if the condition is not met that the new tracking point 64 is on the second plane, the methodology advances to block 560. In block 560, the methodology concludes that the new tracking point 64 is still on an edge. The methodology further determines the contact force and applies the calculated contact force. For example, the contact force can be calculated using:

$$F=K(P_0P_d-N_2)N_2.$$

The calculated contact force is applied to the end effector 20 of the force feedback device. The methodology advances to circle 570 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of real time collision detection between geometric models comprising the steps of:

providing a force feedback device;

providing a computer system operatively connected to the force feedback device;

identifying a current tracking point of the force feedback device representing a first geometric model colliding with a mesh model of a second geometric model and identifying a current triangle associated with the current tracking point;

determining a new tracking point of the force feedback device relative to the mesh model by approximating the new tracking point from the current tracking point and the current triangle;

determining a state of the new tracking point using the new tracking point and the state of the previous tracking point, wherein the state is inside, on an edge or on a vertex of either the current triangle or a new triangle;

using the state of the new tracking point to determine if a predetermined condition is met to conclude that the new tracking point is on the current triangle or if another predetermined condition is met to conclude that the new tracking point crossed to a new triangle, wherein the new triangle is connectively associated with the current triangle;

determining a contact force between the first geometric model and the second geometric model; and concluding a collision between the first geometric model and the second geometric model if the contact force is greater than zero.

2. A method as set forth in claim 1 including the step of initially assuming an inside state of the current tracking point, prior to said step of identifying a current tracking point.

3. A method as set forth in claim 1 wherein said step of determining a new tracking point includes the step of projecting the current tracking point onto a plane defined by the current triangle.

4. A method as set forth in claim 1 wherein said step of determining a state of the new tracking point includes the steps of finding an intersection between a vector connecting the previous tracking point and the current tracking point with an edge of the current triangle, and using the intersection to determine the state of the new tracking point.

5. A method as set forth in claim 1 wherein said step of using the state of the new tracking point includes the steps of:

determining if the state of the new tracking point is set to inside;

determining if a predetermined condition is met indicating the new tracking point is located inside the current triangle, if an inside state is set;

concluding the new tracking point is inside the current triangle, if the predetermined condition indicating the new tracking point is inside the current triangle is met;

determining if a predetermined condition is met indicating the new tracking point is crossing over to a new triangle, if the predetermined condition indicating the new tracking point is inside the current triangle is not met;

concluding the state of the new tracking point is inside a new triangle if the predetermined condition indicating the new tracking point is crossing over to a new triangle is met; and continuing to find the state of the new tracking point using another edge if the predetermined condition indicating the new tracking point is crossing over to a new triangle is not met.

6. A method as set forth in claim 1 wherein said step of using the state of the new tracking point includes the steps of:

determining if the state of the new tracking point is set to an edge;

determining if a predetermined condition is met indicating the new tracking point is moving back into the current triangle, if determined that the state of the new tracking point is set to edge;

concluding the state of the new tracking point is inside the current triangle, if a predetermined condition indicating the new tracking point is moving back into the current triangle is met;

determining if a predetermined condition is met indicating that the new tracking point is on the same edge of the current triangle, if a predetermined condition indicating the new tracking point is moving back into the current triangle is not met;

concluding the state of the new tracking point is the edge of the current triangle, if a predetermined condition indicating that the new tracking point is on the same edge of the current triangle is not met;

determining if a predetermined condition is met indicating that the new tracking point is crossing over to a new triangle, if the predetermined condition that the new tracking point is still on the same edge of the current triangle is not met;

using a geometrically devised look-up table to conclude the state of the new tracking point, if a predetermined condition that the new tracking point is crossing over to a new triangle is met; and continuing to find the new tracking point using another edge if the predetermined condition that the new tracking point is crossing over to a new triangle is not met.

7. A method as set forth in claim 1 wherein said step of using the state of the new tracking point includes the steps of:

determining if the state of the new tracking point is set to a vertex;

determining if a predetermined condition is met indicating the new tracking point is moving back into the current triangle connected with the vertex, if determined that the state of the new tracking point is a vertex;

concluding the state of the new tracking point is inside the current triangle, if a predetermined condition indicating the new tracking point is moving back into the current triangle is met;

determining if a predetermined condition is met indicating that the new tracking point is moving from the vertex to an edge of the current triangle, if a predetermined condition indicating the new tracking point is moving back into the current triangle is not met;

concluding the state of the new tracking point is on the edge of the current triangle, if a predetermined condition indicating that the new tracking point is moving from the vertex to an edge of the current triangle is met;

determining if a predetermined condition is met indicating that the new tracking point is on an edge of a new triangle, if the predetermined condition that the new tracking point is moving from the vertex to an edge of the current triangle is not met;

concluding the state of the new tracking point is on the edge of the current triangle, if a predetermined condition that the new tracking point is on an edge of a new triangle is met, and continuing to find the new tracking point using another edge;

determining if a predetermined condition is met that the new tracking point is crossing onto a vertex of a new triangle, if a predetermined condition that the new tracking point is on an edge of a new triangle is not met;

concluding that the state of the new tracking point is on the vertex of the new triangle, if a predetermined condition that the new tracking point is crossing onto a vertex of a new triangle is met, and continuing to find the new tracking point;

determining if a predetermined condition is met to check a new edge of the current triangle, if a predetermined condition that the new tracking point is crossing onto a vertex of a new triangle is not met;

concluding that the state of the new tracking point is on the vertex of the current triangle, if a predetermined condition to check a new edge of the current triangle is not met; and concluding that the state of the new tracking point is an edge of the current triangle if a predetermined condition to check a new edge of the current triangle is met and continuing to find the new tracking point.

8. A method as set forth in claim 1 wherein the step of determining the contact force comprises calculating a contact force of the new tracking point penetrating the mesh model and applying the force through the force feedback device to replicate a feeling of contact with a rigid object.

9. A method of real time collision detection with a geometric model of a vehicle comprising the steps of:

providing a force feedback device;

providing a computer system operatively connected to the force feedback device;

identifying a current tracking point of the force feedback device representing a point of an object colliding with a mesh model of the vehicle and identifying a current triangle associated with the current tracking point;

determining a new tracking point of the force feedback device relative to the mesh model by projecting the current tracking point onto a plane defined by the current triangle;

determining a state of the new tracking point relative to the current triangle or a new triangle by finding an intersection between a vector connecting the previous tracking point and the current tracking point with an edge of the current triangle, and using the intersection to determine the state of the new tracking point, wherein the state is inside, on an edge or on a vertex of either the current triangle or a new triangle;

using the state of the new tracking point to determine if a predetermined condition is met concluding the new tracking point is on the current triangle or if another predetermined condition is met to concluding the new tracking point is crossing over to a new triangle, wherein the new triangle is connectively associated with the current triangle;

determining a contact force between the new tracking point and the mesh model; and concluding a collision between the object and the mesh model if the contact force is greater than zero.

10. A method as set forth in claim 9 wherein said step of using the state of the new tracking point includes the steps of:

determining if the state of the new tracking point is set to inside;

determining if a predetermined condition is met indicating the new tracking point is located inside the current triangle, if an inside state is set;

concluding the new tracking point is inside the current triangle, if the predetermined condition indicating the new tracking point is inside the current triangle is met;

determining if a predetermined condition is met indicating the new tracking point is crossing over to a new triangle, if the predetermined condition indicating the new tracking point is inside the current triangle is not met;

concluding the state of the new tracking point is inside a new triangle if the predetermined condition indicating the new tracking point is crossing over to a new triangle is met; and continuing to find the state of the new tracking point using another edge if the predetermined condition indicating the new tracking point is crossing over to a new triangle is not met.

11. A method as set forth in claim 9 wherein said step of using the state of the new tracking point includes the steps of:

determining if the state of the new tracking point is set to an edge;

determining if a predetermined condition is met indicating the new tracking point is moving back into the current triangle, if determined that the state of the new tracking point is set to edge;

concluding the state of the new tracking point is inside the current triangle, if a predetermined condition indicating the new tracking point is moving back into the current triangle is met;

determining if a predetermined condition is met indicating that the new tracking point is on the same edge of the current triangle, if a predetermined condition indicating the new tracking point is moving back into the current triangle is not met;

concluding the state of the new tracking point is the edge of the current triangle, if a predetermined condition indicating that the new tracking point is on the same edge of the current triangle is not met;

determining if a predetermined condition is met indicating that the new tracking point is crossing over to a new triangle, if the predetermined condition that the new tracking point is still on the same edge of the current triangle is not met;

using a geometrically derived look-up table to conclude the state of the new tracking point, if a predetermined condition that the new tracking point is crossing over to a new triangle is met; and continuing to find the new tracking point using another edge if the predetermined condition that the new tracking point is crossing over to a new triangle is not met.

12. A method as set forth in claim 9 wherein said step of using the state of the new tracking point includes the steps of:

determining if the state of the new tracking point is set to a vertex;

determining if a predetermined condition is met indicating the new tracking point is moving back into the current triangle connected with the vertex, if determined that the state of the new tracking point is a vertex;

concluding the state of the new tracking point is inside the current triangle, if a predetermined condition indicating the new tracking point is moving back into the current triangle is met;

determining if a predetermined condition is met indicating that the new tracking point is moving from the vertex to an edge of the current triangle, if a predetermined condition indicating the new tracking point is moving back into the current triangle is not met;

concluding the state of the new tracking point is on the edge of the current triangle, if a predetermined condition indicating that the new tracking point is moving from the vertex to an edge of the current triangle is met;

determining if a predetermined condition is met indicating that the new tracking point is on an edge of a new triangle, if the predetermined condition that the new tracking point is moving from the vertex to an edge of the current triangle is not met;

concluding the state of the new tracking point is on the edge of the current triangle, if a predetermined condition that the new tracking point is on an edge of a new triangle is met, and continuing to find the new tracking point using another edge;

determining if a predetermined condition is met that the new tracking point is crossing onto a vertex of a new triangle, if a predetermined condition that the new tracking point is on an edge of a new triangle is not met;

concluding that the state of the new tracking point is on the vertex of the new triangle, if a predetermined condition that the new tracking point is crossing onto a vertex of a new triangle is met, and continuing to find the new tracking point;

determining if a predetermined condition is met to check a new edge of the current triangle, if a predetermined condition that the new tracking point is crossing onto a vertex of a new triangle is not met;

concluding that the state of the new tracking point is on the vertex of the current triangle, if a predetermined condition to check a new edge of the current triangle is not met; and concluding that the state of the new tracking point is an edge of the current triangle if a predetermined condition to check a new edge of the current triangle is met and continuing to find the new tracking point.

13. A method as set forth in claim 9 wherein said step of determining comprises calculating a contact force of the new tracking point penetrating the mesh model and applying the force through the force feedback device to replicate a feeling of contact with a rigid object.

14. A method of real time collision detection and force feedback with a geometric model of a vehicle comprising the steps of:

providing a force feedback device;

providing a computer system operatively connected to the force feedback device;

identifying a current tracking point of the force feedback device representing a point of a rigid object colliding with a mesh model of the vehicle and identifying a current triangle associated with the current tracking point;

determining a new tracking point of the force feedback device relative to the mesh model by projecting the current tracking point onto a plane defined by the current triangle;

determining a state of the new tracking point relative to the current triangle or a new triangle by finding an intersection between a vector connecting the previous tracking point and the current tracking point with an edge of the current triangle, and using the intersection to determine the state of the new tracking point, wherein the state is inside, on an edge or on a vertex of either the current triangle or a new triangle;

using the state of the new tracking point to determine if a predetermined condition is met concluding the new tracking point is on the current triangle or if another predetermined condition is met to concluding the new tracking point is crossing over to a new triangle, wherein the new triangle is connectively associated with the current triangle;

determining a contact force between the new tracking point and the mesh model by calculating a contact force of the new tracking point; and concluding a collision if the contact force is greater than zero for penetrating the mesh model and applying the force through the force feedback device to replicate a feeling of contact with the rigid object.

15. A method as set forth in claim 14 wherein said step of using the state of the new tracking point includes the steps of:

determining if the state of the new tracking point is set to inside;

determining if a predetermined condition is met indicating the new tracking point is located inside the current triangle, if an inside state is set;

concluding the new tracking point is inside the current triangle, if the predetermined condition indicating the new tracking point is inside the current triangle is met;

determining if a predetermined condition is met indicating the new tracking point is crossing over to a new triangle, if the predetermined condition indicating the new tracking point is inside the current triangle is not met;

concluding the state of the new tracking point is inside a new triangle if the predetermined condition indicating the new tracking point is crossing over to a new triangle is met; and continuing to find the state of the new tracking point using another edge if the predetermined condition indicating the new tracking point is crossing over to a new triangle is not met.

16. A method as set forth in claim 14 wherein said step of using the state of the new tracking point includes the steps of:

determining if the state of the new tracking point is set to an edge;

determining if a predetermined condition is met indicating the new tracking point is moving back into the current triangle, if determined that the state of the new tracking point is set to edge;

concluding the state of the new tracking point is inside the current triangle, if a predetermined condition indicating the new tracking point is moving back into the current triangle is met;

determining if a predetermined condition is met indicating that the new tracking point is on the same edge of the current triangle, if a predetermined condition indicating the new tracking point is moving back into the current triangle is not met;

concluding the state of the new tracking point is the edge of the current triangle, if a predetermined condition indicating that the new tracking point is on the same edge of the current triangle is not met;

determining if a predetermined condition is met indicating that the new tracking point is crossing over to a new triangle, if the predetermined condition that the new tracking point is still on the same edge of the current triangle is not met;

using a geometrically derived look-up table to conclude the state of the new tracking point, if a predetermined condition that the new tracking point is crossing over to a new triangle is met; and continuing to find the new tracking point using another edge if the predetermined condition that the new tracking point is crossing over to a new triangle is not met.

17. A method as set forth in claim 14 wherein said step of using the state of the new tracking point includes the steps of:

determining if the state of the new tracking point is set to a vertex;

determining if a predetermined condition is met indicating the new tracking point is moving back into the current triangle connected with the vertex, if determined that the state of the new tracking point is a vertex;

concluding the state of the new tracking point is inside the current triangle, if a predetermined condition indicating the new tracking point is moving back into the current triangle is met;

determining if a predetermined condition is met indicating that the new tracking point is moving from the vertex to an edge of the current triangle, if a predetermined condition indicating the new tracking point is moving back into the current triangle is not met;

concluding the state of the new tracking point is on the edge of the current triangle, if a predetermined condition indicating that the new tracking point is moving from the vertex to an edge of the current triangle is met;

determining if a predetermined condition is met indicating that the new tracking point is on an edge of a new triangle, if the predetermined condition that the new tracking point is moving from the vertex to an edge of the current triangle is not met;

concluding the state of the new tracking point is on the edge of the current triangle, if a predetermined condition that the new tracking point is on an edge of a new triangle is met, and continuing to find the new tracking point using another edge;

determining if a predetermined condition is met that the new tracking point is crossing onto a vertex of a new triangle, if a predetermined condition that the new tracking point is on an edge of a new triangle is not met;

concluding that the state of the new tracking point is on the vertex of the new triangle, if a predetermined condition that the new tracking point is crossing onto a vertex of a new triangle is met, and continuing to find the new tracking point;

determining if a predetermined condition is met to check a new edge of the current triangle, if a predetermined condition that the new tracking point is crossing onto a vertex of a new triangle is not met;

concluding that the state of the new tracking point is on the vertex of the current triangle, if a predetermined condition to check a new edge of the current triangle is not met; and concluding that the state of the new tracking point is an edge of the current triangle if a predetermined condition to check a new edge of the current triangle is met and continuing to find the new tracking point.

18. A method as set forth in claim 14 wherein said step of calculating the contact force of the new tracking point includes the steps of determining if the state is set to inside and modeling the new tracking point as a uniformly distributed spring and damper mesh to determine the force if the state is set to inside.

19. A method as set forth in claim 14 wherein said step of calculating the contact force of the new tracking point includes the steps of determining if the state is set to vertex, and modeling the new tracking point as a gravitational sphere to determined the force if the state is set to vertex.

20. A method as set forth in claim 14 wherein said step of calculating a force of the new tracking point penetrating the mesh model includes the steps of:

determining if the state is set to edge;

determining if the new tracking point is moving to free space if the state is set to edge;

setting the force equal to zero if the new tracking point is moving to free space; and determining if the new tracking point is stationary on the edge or sliding along a facet connected with the edge if the new tracking point is not moving to free space, wherein the force is determined from its position on either the facet or the edge.

* * * * *